United States Patent
Thompson et al.

(10) Patent No.: US 12,256,030 B1
(45) Date of Patent: Mar. 18, 2025

(54) DATA EXCHANGE PLATFORM ENABLED BY BLOCKCHAIN AND CLOUD INFRASTRUCTURE

(71) Applicant: Avista Development, Inc., Spokane, WA (US)

(72) Inventors: Jonathan Scott Thompson, Spokane, WA (US); Curtis Allen Kirkeby, Spokane, WA (US); John Zachary Gibson, Post Falls, ID (US)

(73) Assignee: Avista Development, Inc., Spokane, WA (US)

( * ) Notice: Subject to any disclaimer, the term of this patent is extended or adjusted under 35 U.S.C. 154(b) by 344 days.

(21) Appl. No.: 17/889,999

(22) Filed: Aug. 17, 2022

Related U.S. Application Data

(60) Provisional application No. 63/234,111, filed on Aug. 17, 2021.

(51) Int. Cl.
*H04L 67/12* (2022.01)
*H04L 9/00* (2022.01)
*H04L 9/32* (2006.01)
*H04L 67/55* (2022.01)

(52) U.S. Cl.
CPC .............. *H04L 9/50* (2022.05); *H04L 9/3236* (2013.01); *H04L 67/12* (2013.01); *H04L 67/55* (2022.05)

(58) Field of Classification Search
None
See application file for complete search history.

*Primary Examiner* — Brian Whipple
(74) *Attorney, Agent, or Firm* — Lee & Hayes, P.C.

(57) ABSTRACT

A cloud enabled data exchange platform configured to accept sensed information from publishers and allows downloading of sensed information by subscribers. The platform may utilize a blockchain to verify sensed information without sharing private information, act as a transaction ledger, or provide an interface for digital services/interaction with data. Microservices may be offered on the platform to both publishers and subscribers, such as preconfigured smart city solutions or pre-developed artificial intelligence and machine learning solutions. Publishers may control the format in which sensed information is uploaded. Subscribers may control the format in which sensed information is downloaded.

20 Claims, 16 Drawing Sheets

1200

DOWNLOADING FROM PLATFORM.....

PLEASE MAP DELIVERED FIELDS TO DESIRED FIELDS } 1202

------------------- 1204

SOLAR PANEL ASSET

\"IDENTIFIER\"
\"DATE-TIME\" → ID-DATE } 1208

\"ELECTRICITY CREATED\"
\"DESCRIPTION\"
\"NOTES\" → ELECTRICITY INFORMATION } 1210
\"MISCELLANEOUS\"

------------------- 1206

AIR QUALITY MEASURING ASSET

\"IDENTIFIER\"
\"DATE-TIME\" → ID-DATE } 1212

\"FRESH-NOT FRESH\"
\"HCHO\"
\"TVOC\" → FRESHNESS-AIRREADINGS } 1214
\"PM2.5\"
\"PM10\"

\"NOTES\"
\"MISCELLANEOUS\" → AIRQUALITYNOTES } 1216

DOWNLOADING FROM PLATFORM.....

PLEASE MAP DELIVERED FIELDS TO DESIRED FIELDS } 1302

SOLAR PANEL ASSET
\"IDENTIFIER\"
\"DATE-TIME\"
\"ELECTRICITY CREATED\"
\"DESCRIPTION\"
\"NOTES\"
\"MISCELLANEOUS\"
} 1304

AIR QUALITY MEASURING ASSET
\"IDENTIFIER\"
\"DATE-TIME\"
\"FRESH-NOT FRESH\"
\"HCHO\"
\"TVOC\"
\"PM2.5\"
\"PM10\"
\"NOTES\"
\"MISCELLANEOUS\"
} 1306

FIG. 13

DATA EXCHANGE PLATFORM ENABLED BY BLOCKCHAIN AND CLOUD INFRASTRUCTURE

CROSS-REFERENCE TO RELATED APPLICATIONS

This application claims priority to U.S. Provisional Application No. 63/234,111, filed Aug. 17, 2021, entitled "Data Exchange Platform Enabled by Blockchain and Cloud Infrastructure," the entirety of which is herein incorporated by reference.

BACKGROUND

The proliferation and use of the Internet of Things (IoT) has brought about an abundance of information that describes actions of people and entities, as well as the machines and devices they operate. With this, there is a growing concern of "surveillance capitalism" in which corporations may utilize this information for commercial gain. However, this information may be widely shared, raising issues of data privacy, security, and anonymity. Described herein are techniques that can be used, among other things, to improve data collaboration.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 12 illustrates an example diagram showing a subscriber preview of a data schema through a user interface, according to examples of the present disclosure.

FIG. 13 illustrates an example diagram showing a publisher preview of a data schema through a user interface, according to examples of the present disclosure.

DETAILED DESCRIPTION

Figure 1:
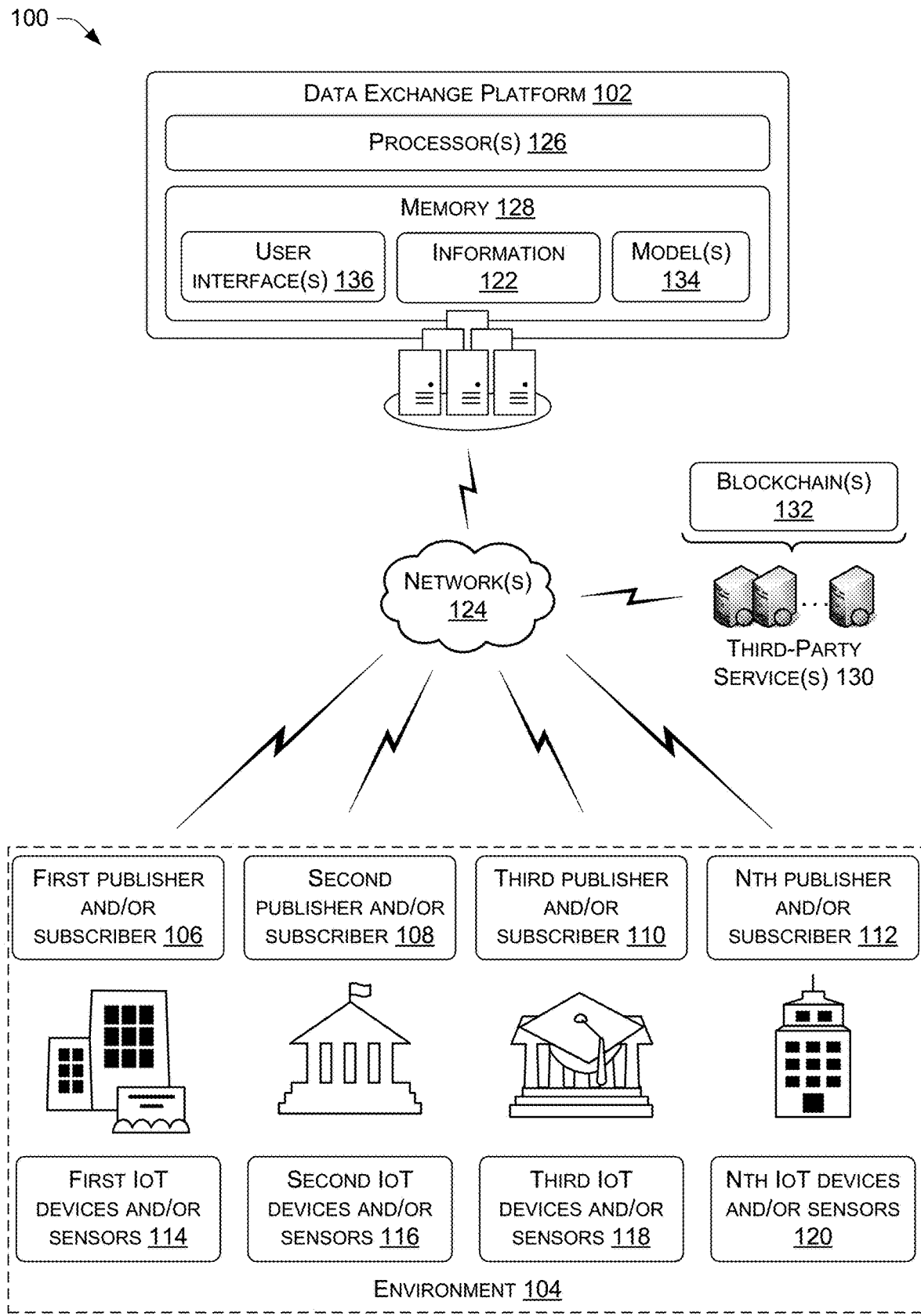
FIG. 1 illustrates an example diagram associated with a data exchange platform, according to examples of the present disclosure.

As introduced above, information is often collected and/or analyzed for use by corporations to their own windfall. Consumers, for example, may have no knowledge that their information is being shared and/or that information is being collected. Given the growing concerns of privacy, this may lead to consumers seeking more protection of their information. However, in some instances, there is a public good and use of such information, for example, when there is a certain level of data transparency. By way of example, the IoT may provide crucial information about how cites cities operate, such as traffic data, electrical use data, gas usage data, water usage data, air quality, and so forth. As such, while there is a need for the protection of data, at the same time, there is also a need to freely share certain types of information for a public good and/or for the creation of data economies.

This disclosure is directed, at least in part, to a data exchange platform ("platform") that allows users of the platform, such as publishers and subscribers, to publish information on the platform and download information from the platform, respectively. As used herein, "publishers" may refer to persons, entities, organizations, and that like who upload information onto the platform, while "subscribers" may refer to persons, entities, organization, and the like that download the information from the platform. In some instances, a single person, entity, or organization may be both, at one time, a publisher and a subscriber. Importantly, the platform provides a way for publishers to safely and securely share their information with others, as well as select which information is shared. To ensure the privacy and/or anonymity of the information, blockchain techniques may be used to de-identify, or scramble, the information of the publishers, but also allow the subscribers to identify the source of the information in order for that information to be shared and/or acted upon in a decentralized manner. This ensures that the information is trustworthy and accordingly, may be meaningfully used by the subscribers. For example, rules of engagement for how data is filtered and transformed, and shared through various of levels trust may be implemented into the blockchain and secured through the blockchain consensus mechanism to validate transactions, data integrity, and data access for users. Moreover, in some instances, machine learning (ML) techniques may be used to recommend or carry out certain action(s), such as drawing complex relationships between the information, to provide smart city solutions.

The publishers may have various IoT, such as devices and sensors, that generate the information (e.g., sensor data, audio data, and the like). These devices and sensors may be considered assets of the publishers as they generate information that may be usable, for example, by the subscribers. The devices and sensors may include any suitable components, such as processors, memory, imaging devices (e.g., RGBD camera(s), 3D camera(s), etc.), microphones, LiDAR, RADAR, temperature sensors, humidity sensors, light sensors, flow rate sensors, and so forth. For example, first sensors may measure traffic (e.g., volume), while second sensors may measure water usage, electricity usage, and so forth. Still, this information may represent raw data, or the data may be manipulated by the publishers prior to uploading to the platform. For example, the publisher itself may organize the information in a digestible format for itself, such as knowing how traffic impacts electricity usage.

The information, as it pertains to the present disclosure, may be used in context of creating "smart cities" to improve governance, planning, management, and livability, for example. In part, this is accomplished by gathering real-world, and real-time, information using the IoT devices and/or sensors. For example, traffic sensors of a city may be placed at various locations around the city to monitor traffic flow to optimize the timing of traffic lights that results in both reduced traffic, congestion, pollution, and so forth. Among other benefits, this may allow drivers, and arguably pedestrians, to travel to their destinations more quickly and more safely. Further, by understanding traffic flow, businesses may optimize their hours, staffing, or availability. In this manner, such information is gathered for analysis to draw relationships between various characteristics within a city and drive decision making. However, the collection of information and dissemination of such information may be used for any purposes. Further, as the information may be used to drive decision making, make recommendations, and so forth, the information may be considered an asset of the publisher and/or an asset in which the subscriber desires to obtain.

In some instances, the information provided to the platform is often personal, private, and/or secure that should not be shared freely without consent and/or approval. However, the platform may use or instill blockchain technology allows the information to be de-identified or scrambled, but also allows subscribers to identify the source of the information since such information may be shared, in a decentralized manner. For example, a large university may publish the eating patterns of its students without individually identifying the students, or even identifying itself by name, opting to just identify as a large university. Scrambling and/or utilizing cryptographic keys to hide private/secure information, such as a university's name, may be utilized while freely sharing other information like air quality and geographic area. Additionally, a university may want to publish its pattern of use of utilities (e.g., gas, electric, water) throughout the year in order to allow it, or others, to make decisions. For example, unexpected peaks in usage of electricity may be generally identified and conservation efforts may be established to reduce electricity use during peak time frames. The scrambling or deidentification of such information may provide confidence to the publishers that their information is being protected.

Further, blockchain techniques may be utilized to allow the information to be shared across an immutable distributed network, where every node of a blockchain network may receive a copy of the blockchain. As described in more detail below, any consensus algorithm may be used to post blocks to the blockchain network. For example, a semi-permissioned consensus algorithm may be utilized to allow the platform to post blocks to the blockchain and only allow the publishers and/or the subscribers to read the blocks. In some instances, the publishers and/or the subscribers may not have permission to post blocks to the blockchain network. This may increase a trust of the publishers and/or the subscribers in the blockchain network as to the authenticity of the information. However, other methods of consensus may be used. For example, proof of work, proof or stake, Byzantine methods, or even round robin consensus algorithms may be used.

Blockchain techniques may also be used as a transaction ledger to generate a distributed ledger of transactions that have transgressed on the platform. In some instances, the use of blockchain allows the publishers and/or the subscribers to verify a type and/or identify of entity who publishes the information and/or subscribes who access the data on the platform, while at the same time, hiding confidential information such as name and address of the publishing entity and/or the subscribing entity. However, being that the blockchain may share the same ledger, any unauthorized tampering of blocks may be challenged and shown to be untrue, by any of the nodes within the blockchain. Furthermore, hashes, such as a Merkle tree, may be used by any of the nodes to verify that the transactions stored in the blocks are in fact original transactions and have not been compromised.

In some instances, blockchain messages of the platform may contain a blockchain header as well as blockchain details. In some instances, the blockchain header may contain a Markle tree root hash, previous block hash, nBits, nonce, and/or timestamp. In some instances, the blockchain detail may include fields such as a transaction counter, unique identifier, verified source, dataset type, entity/organization, type, publisher, subscriber, publisher type, subscriber type, contract type, and/or category type. The blockchain header, the blockchain details, as well as message fields may help identify a publisher or subscriber of the platform such that others may make an informed decision as to whether the information is of value.

The platform includes an application program interface (API) for communicating with the IoT to receive information from the publishers and respond to requests for the information from the subscribers. In some instances, the platform may include a data unifier program that ingests the information into usable formats for the subscribers. For example, the IoT may generate information in different formats. The data unifier program allows differently formatted information, from a myriad of disparate sources (e.g., the devices and/or sensors), to be unified into a single usable format. In some instances, the single usable format allows the platform to ingest the information in one easy to read format that increases efficiency and preserves the integrity of the information. In some instances, software development kits (SDKs) may also be utilized to foster communication and integration between disparate systems and devices. For example, the SDKs may interact with the platform API and components of the blockchain network.

In some instances, the data unification process ingests data and applies data transformations based on specified rulesets that are implemented to support the data federation and unification stage. The users, or the platform itself, may specify or dictate the rulesets. In some instances, the rulesets may be implemented as a smart contract where lifecycle and change management of the rulesets may be defined through consensus mechanism supported by the blockchain. Data may be uploaded to the platform in various formats, structured, and un-structured. The data unification process may use event-driven data transformation to process multiple data input formats to a unified data output format. In addition to data formatting, the data unification process may unify data abstraction layers such as applying data filtering, calculating averages, adding noise, apply time windowing functions, and manage the unifying of time how often the processed data is published and available.

The platform, in some instances, may also aggregate data from disparate sources to provide a unified data interface that is consumed by the subscribers, or systems (i.e., decentralized data interface). For example, real-time event data from disparate organizations' devices or systems, or devices of the general public, may be streamed and/or uploaded to the platform, where the data unifier fits data to schema consistency, then a data aggregator may be applied that aggregates and synchronizes data event streams based on time stamp or data time of arrival, or some other synchronization mechanism, and presented via the platform via secure unified data interface. In some instances, the publishers of the information have the ability to control not only what information is published, but how much of that information is published and/or what portions of the information are to remain private and secure. For example, users may choose the data collaboratives they want to support and interact to deliver the value proposition of that data collaborative to its members. In some instances, a decentralized autonomous organization (DAO) may be leveraged to manage the governance of the shared rulesets that are applied to the data collaborative to support data protection and privacy, data federation, and access control. Users can vote on lifecycle and change management of the rulesets through consensus mechanism supported by the blockchain. Alternatively, a centralized authority may manage the rulesets and access (e.g., regulatory body).

The platform may also utilize a user interface to view and setup contract details of platform users, such as the publishers and the subscribers. The user interface may allow a platform administrator to modify the contract term of a user, including the user's active date and ending date. Monthly service quotas of users may be modified on the user interface as well. For example, data transfer, data publishing, data subscription, data storage, and/or SQL query limits all may be viewed and modified per contractual obligations. The user interface may also provide a graphical view of current monthly usage (or other timeframe usage), for example, a user who is utilizing 35% of their publishing capacity in a given month may be shown such utilization in a bar graph. Also, in some instances, the user interface may provide summary information such as how many entities are currently on the platform, how many users are currently on the platform, and how much information (or data assets) are currently on the platform.

Information that is available to the subscribers may be presented on the platform as well, for example, via the user interface. In some instances, the platform may also provide pre-grouped datasets for subscription and publication such that information may be posted and retrieved in an organized manner. In some instances, publishers may be able to select a field upload structure, or schema, in which their information is published on the platform. For example, a utility provider may choose to publish information associated with electricity generated and air quality, while a university may want to publish information related to a number of visitors to buildings per a given period of time or their utility use patterns over a given period of time. The publishers are therefore permitted to define a structure by which their information is made accessible on the platform. In doing so, publishers may be given the autonomy not only what information is published, but how much of that information is published.

In some instances, the platform may also utilize a user interface to administer user account details. New platform accounts may be setup and deployed through use of environment variables and asset configuration. User accounts on the platform may be managed for platform resources and utilization statistics. Platform service accounts may be managed to set service quotas and manage authorized users on an account. Platform governance may be assisted with reports and audits of a platform account. The users assigned to a platform account may be granted certain read and/or write database access, what dataset subscriptions they may read/write to, what publishing datasets a user may read/write to, and what login features a user of an account may have. This user interface may also provide platform core services. Platform core services related to APIs may be provided by the user interface such that data catalogs of platform users may be discoverable, and organized by entity, network, project or other tag attributes. Platform core services related to data services may be provided through the user interface allowing settings modifications of time series databases and object datastores. Platform core series of data subscription may be accessed through the user interface allowing subscription to available datasets. For notification services, the user interface may provide pages to set platform and data governance settings.

Once a subscriber desire access to information of the platform, such information may be provided to the subscribers in a plurality of manners. In some instances, the information may be organized using predefined templates. For examples, templates may be based on the type of information, the type of subscriber, the intended purpose of the information, the amount of information requested, and so forth. In this manner, the templates may efficiently organize the information in a digestible manner for use by the subscribers. In other instances, the subscribers may be able to select a field download structure, or schema, in which to download the information. For example, subscribers may be able to map multiple published fields of the information into one field, for example, putting together the fields identifier and date/time, into one field called identifier-date/time. Moreover, in some instances, the field formats may be modified to fit a subscriber's system, for example, a number field may be converted to text for easier digestion. Example subscribers may be software engineers who create a custom schema to download information from the data exchange platform where such information may be used by developed applications where the developed applications interact with the downloaded information.

In some instances, the information uploaded to the platform may be stored on a third-party cloud provider, or a third-party service offering blockchain services. For example, as the platform receives a request to publish the information, the platform may request the third-party service to add the information (e.g., as a block) to the blockchain. Therein, the third-party service may transmit an indication back to the platform successfully indicating whether or not the information has been added to the blockchain. Additionally, the third-party service may provide an indication of the newly added block to the blockchain network.

In some instances, the platform may provide or otherwise offer micro services to the publishers and/or the subscribers. For example, the platform may include artificial intelligence (AI) and/or ML capabilities. Using the AI and/or ML, the platform may make predictions from the published information. In other instances, the platform may contract with the third party service to using AI/ML techniques to make predictions on the information. As an example, ML techniques may draw correlations between the information, such as how weather affects traffic conditions. Here, the ML techniques may process weather and traffic data, to determine, for example, when the weather is 50° F. and raining, traffic volume is 50% of a normal capacity and when the weather is 80° F. and sunny, traffic volume is 110% of the normal capacity. A city government may take advantage of such results to determine solutions for building infrastructures. However, this is just one example, and the platform may provide other type reports to determining solutions or making predictions associated with the information.

The present disclosure provides an overall understanding of the principles of the systems, methods, apparatuses, and other technologies, disclosed herein. One or more examples of the present disclosure are illustrated in the accompanying diagrams. Those of ordinary skill in the art will understand and appreciate that the systems, methods, apparatuses, and other technologies, specifically described herein and illustrated in the accompanying diagrams are non-limiting examples. The features illustrated or described in connection with one example, or instance, may be combined with the features of other examples or instances. Such modifications and variations are intended to be included within the scope of the disclosure and appended claims.

FIG. 1 illustrates a non-limiting example of a system 100 in accordance with the present disclosure. The system 100 may include a data exchange platform 102 ("platform") that allows persons or entities, such as publishers, to upload information and persons and entities, such as subscribers, to receive the information. As it relates to the present disclosure, the system 100 may be implemented or find use within an environment 104, such as a city. The city may include, or be made of up, a plurality of different structures (e.g., buildings), and the structures themselves may have a plurality of IoT devices and/or sensors. In some instances, the IoT devices and/or sensors may disposed on, within, or otherwise about the structures of the environment 104, or any other type of physical infrastructure located throughout the environment 104. As such, it should be understood that more than just structures may be sensed. For example, any device that generates information may be sensed such as vehicles, airplanes, utility poles, traffic lights, and so forth.

The environment 104 is shown including a first publisher and/or subscriber 106, a second publisher and/or subscriber 108, a third publisher and/or subscriber 110, and up to an nth publisher and/or subscriber 112. Although the publishers and/or subscribers 106-112 are shown being associated with a respective entity (e.g., commercial location, government entity, educational institution, etc.), other structures and/or entities may be included (e.g., airport, mall, sports complex, schools, medical, electrical power systems, road networks, etc.). In some instances, each of the publishers and/or subscribers 106-112 may be associated with respective IoT devices and/or sensors that generate information. For example, the first publisher and/or subscriber 106 may be associated with first IoT devices and/or sensors 114, the second publisher and/or subscriber 108 may be associated with second IoT devices and/or sensors 116, the third publisher and/or subscriber 110 may be associated with third IoT devices and/or sensors 118, and the nth publisher and/or subscriber 112 may be associated with nth IoT devices and/or sensors 120. The IoT devices and/or sensors 114-120 may respectively generate information 122 (e.g., data) that is shared or otherwise provided to the platform 102 via a network 124. For example, the IoT device and/or sensors 114-120 may be attached or otherwise disposed throughout the structure to sense, and report, different findings.

The platform 102 is shown including processor(s) 126 and memory 128, where the processor(s) 126 may perform various functions and operations described herein, and the memory 128 may store instructions executable by the processor(s) 126 to perform the operations described herein. The platform 102 is shown storing the information 122 within the memory 128, where the information 122 may represent the data generated by the IoT devices and/or sensors 114-120. For example, as part of the publishers and/or subscribers 106-112 being users of the platform 102, the information 122 may be uploaded to the platform 102. Such information 122 may be uploaded according to predetermined schedules (e.g., as contracted by the publisher), or based on indications received from the publishers. For example, the publishers may indicate which information is to be provided to the platform 102, as well as when such information is to be provide (e.g., hourly, daily, etc.).

Upon receipt of the information 122, in some instances, the platform 102 may contract or otherwise engage with third-party service(s) 130. The third-party service(s) 130 may be representative of a ledger system or a blockchain system that adds the information 122 to blockchain(s) 132 stored by and/or otherwise managed by the third-party service(s) 130. The third-party service(s) 130 include components (i.e., a blockchain system) that adds the information (e.g., as blocks) to the blockchain(s) 132 and then sends a confirmation back to the platform 102 indicating that the information 122 has been added to the blockchain(s) 132. In some instances, the platform 102 may or may not store the information 122 within the memory 128, but such information 122 may be accessed via the third-party service(s) 130.

The blockchain(s) 132 further allow for the de-identification, or scrambling of, the information 122 of the publishers, which may be private information. However, the blockchain(s) 132 also allow subscribers to identify the source of the information 122 since such information 122 may be shared in a decentralized manner. As will be explained herein, nodes within a blockchain network may receive a copy of the block and can verify that the information 122 came from a certain source by checking their copy of the blockchain (i.e., a ledger), in effect, taking advantage of blockchain's immutable quality. The blockchain(s) 132 may also be used to store transactions that have transgressed while the platform 102 is in use and may be used as a interface for digital services/interaction with the information 122.

In some instances, the information 122 provided to the platform 102 is in the form of a model 134 and/or the model 134 may be determined via the platform 102, based at least in part on the information 122. In some instances, the model 134 is associated with a physical or digital infrastructure having different states. In some instances, the models 134 provide context to real-world physical and/or digital systems and are generally used to describe physical and/or logical arrangements, relationships, characteristics, behaviors and interactions. For example, an electric power system of the environment 104 could be modeled as a logical interconnected network of electricity generating sources, transmission networks, substation and distribution networks, and load centers. In some instances, a state may be applied to the model(s) 134. For example, an electric utility company may have a model 134 of an electric distribution network topology that includes the spatial and logical location of breakers on the electric distribution system that interrupt and change the routing and flow of electricity supply. The status of the breakers, either open or close, may provide information about the state of the electric distribution system, such as the state of configuration of the network distribution system topology from which the electric supply is routed to customers. In some examples, the model(s) 134 provide context for real-world systems and phenomenon in which information is applied to the model(s) 134 in order to understand the state. In some instances, the state of the model(s) can be historical, current, or forward-looking (e.g., predictive). The model(s) 134 and/or states may be stored on the platform and/or the blockchain 132. Still, in some instances, the third-party service(s) 130 may determine the models 134 based on the information 122 and/or using predictive analytics (e.g., ML models).

In some instances, the platform 102 may support higher-order macro models and state (that span across traditional information boundaries and/or providers) that can be defined, derived, managed, and updated in-platform in near-real-time (e.g., in a blockchain) where data managed and received by network participants (e.g., public authorities, energy utilities, and other trusted entities) can contribute to maintaining components of the higher-order macro models, information, and state. For example, the platform 102 may allow creation of a macro model that models electricity utilization for a section of a country, such as the Northeast Region of the United states. Functioning as a macro model, under this example, a macro model of energy utilization may be provided not only for a city, municipality, or state, but for a whole region of the country. Subscribers who participate in this macro model will have access to analyze and use this macro information for their own benefit and use.

As such, active subscribers and authorized passive subscribers can subscribe to receive collective updates to the macro model and state information via a decentralized data interface and shared trust infrastructure (i.e., unified data interface). Higher-order models and state information management on the platform 102 may span across multiple contexts and boundaries, supported by multiple participants. As such, the utilization of blockchain technology can help enable this new paradigm of decentralized data economies. Conventionally, models, information, and state have traditionally been managed within their own industry and agency silos. However, since the platform 102 is a new digital infrastructure that enables new decentralized data economies, and those new modes of value creation and insights, network participants can now contribute to macro data models and states that span across the traditional boundaries (e.g., cross-organizational data collaboration, public data collaboration) to allow for more cooperative and coordinated government and business.

The platform 102 may utilize or take advantage of large data processing and storage utilizing cloud technology for performance rationality. In some instances, the information 122 may be published on the blockchain(s) 132 where performance would not be hindered. For example, real time natural gas usage data fed into the platform 102 may be stored on the third-party service(s) 130 for later reference and use, and where the blockchain(s) 132 may be used to store de-identified information as to who the natural gas usage relates to. However, as some platform solutions may entail real-time feeds to subscribers, publishers, and/or other persons/entities who may need the information in the present to make a decision, but may not need future storage of the real time information for later usage.

The third-party service(s) 130 provide, on its own physical storage facility, on a server farm, or any other method and/or technology solution which provides feasible means to store, and share, large amounts of information. Specifically, some examples of this disclosure seek a storage means practical for a smart city to, effect, smart city benefits. For example, if the information 122 is stored on a third-party cloud provider, like Amazon's Web Services ("AWS") (but not limited to such provider), such information may be stored and processed through different components and modules.

In some instances, the third-party service(s) 130 may offer a data ingestion, processing, and/or storage that utilizes services such as AWS IoT Core, Kinesis, Kinesis Data Analytics, and Time Stream. It should be noted that the platform 102 is not limited to AWS technologies but could also be implemented using technologies such as Google Cloud Platform, Microsoft Azure, and IBM Cloud. In some instances, the third-party service(s) may offer a partner access module through solutions, such as Amazon S3 and Redshift, which offer a data lake module through a solution such as Amazon S3 (as noted above, not limited to AWS). Finally, the third-party service(s) 130 may offer a module for data analytics and prediction services (e.g., ML) through providers like Quicksite, Sagemaker, or any other tool of choice.

In some instances, the platform 102 may not store the information 122 received from publishers, but may rather unify, aggregate, and/or route the information in near-real-time to a unified data interface in which authorized subscribers can securely access data streams. Attributes of the real time data enabled by the platform 102 may still be collected and stored on immutable storage infrastructure, such as on the blockchain 132. As should be noted, in this form, the function of the platform 102 may be more of a router of collected and manipulated data, instead of serving partly as a datastore. As could be understood, certain types of data may be used within the time it is sensed, in real time, or near real time. For example, certain modes of operation of an energy asset that is participating in a electric utility program, such as an energy storage device owned by the utility customer, may be dispatched based on real-time, or near-real time, data of peak electrical use, because the decision is based off of real time or near real time available data.

In some instances, the devices and/or sensors may be used to integrate the information into a cloud-based version of the platform 102. Such sensing apparatuses and devices may utilize a combination of smart-city solutions like Volttron, Sitewise Edge, OpenDSP, and/or Greengrass Core to ensure the platform is populated with information that may create multiple smart city solutions to those in need of such solutions. As the described technologies work in conjunction with a cloud, they offer features which make up a practicable smart city solution where sensed information is stored in the cloud from cloud compliant devices at peak performance. As the speed of access to information is critical in any technological solution, not just smart city solutions, such compatibility may be crucial to delivering smart city solutions more quickly, in a more efficient, and/or in a more robust manner. However, although a particular use case is described, this disclosure is not limited to such nor any specific technologies. For example, the techniques described herein may provide other smart-city solutions, or may be used for solutions other than those for smart cities.

The platform 102 may provide user interface(s) 136 that enable the publishers and/or subscribers 106-112 to interact with and/or create at least smart city solutions. As will be described in more detail below, the publishers and/or subscribers 106-112, using the user interface(s) 136, have the ability to preview the information 122 that will be uploaded or downloaded to the platform 102. For example, a publisher may get a schema preview as to how their data elements are uploaded and may be allowed to configure how the information is uploaded. This allows the publisher to add and/or delete fields of information as needed, as well as order the fields of information as needed. A subscriber may also get a schema preview to show how the information downloaded will look, at least structurally, and may even have the possibility to modify such structure and/or format to fit the subscriber's needs.

The platform 102, the third-party service(s) 130, the IoT devices and/or sensors 114-120, as well as other devices, are shown being communicatively coupled via the network(s) 124. The network(s) 124 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The platform 102, the third-party service(s) 130, the IoT devices and/or sensors 114-120, as well as other devices include suitable components, interfaces, and the like for communicating over the network(s) 124.

In some instances, the platform 102 and/or the third-party service(s) 130 may be implemented as one or more servers and may, in some instances, form a portion of a network-accessible computing platform implemented as a computing infrastructure of processors, storage, software, data access, etc. that is maintained and accessible via a network such as the Internet. Common expressions associated with the management system 110 include "on-demand computing", "software as a service (SaaS)", "platform computing", "network-accessible platform", "cloud services", "data centers", etc.

As used herein, a processor, such as the processor(s) 126 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 128, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
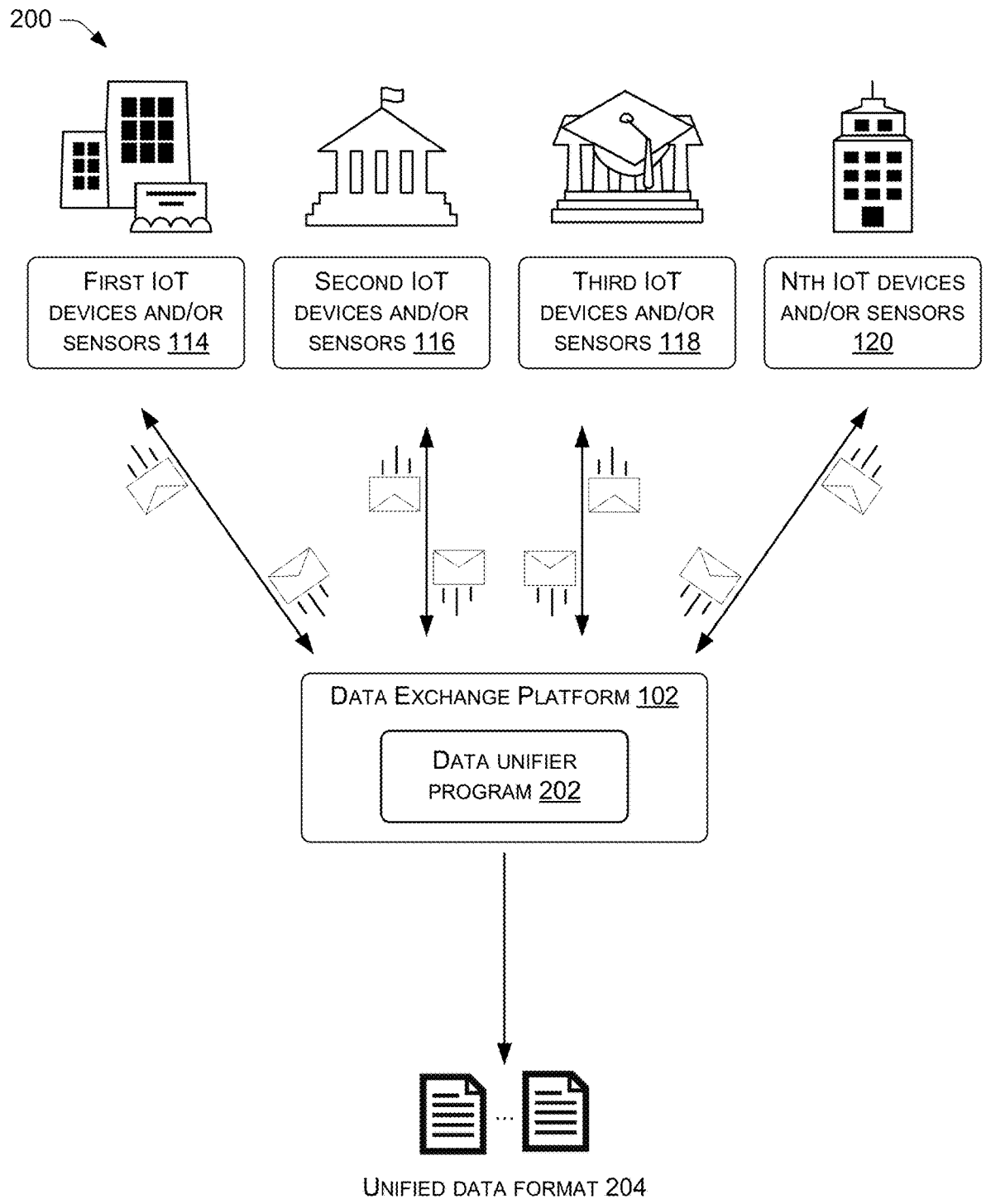
FIG. 2 illustrates an example file format unification program, according to examples of the present disclosure.

FIG. 2 illustrates a diagram 200, showing a file format unification process, in accordance examples of the present disclosure. As shown in in FIG. 2, the first IoT devices and/or sensors 114, the second IoT devices and/or sensors 116, the third IoT devices and/or sensors 118, and/or the nth IoT devices and/or sensors 120 may respectively generate information 122. In addition to the components listed and described above in FIG. 1, the platform 102 in some instances may additionally include a data unifier program 202 that is configured to receive the information 122 and produce a unified data format 204. For example, each of the IoT devices and/or sensors 114-120 may export the information 122 in different formats, the data unifier program 202 may produce the unified data format 204.

For example, the first IoT devices and/or sensors 114 may export the information 122 in format A (or a first format) using Cisco smart city software. The second IoT devices and/or sensors 116 may export the information 122 in format B (or a second format different than the first format) using Siemens smart city software. The third IoT devices and/or sensors 118 may export the information 122 in format C (or a third format different than the first format and the second format) using Microsoft smart city software. The nth IoT devices and/or sensors 120 may export the information 122 in format D (or a fourth format different than the first format, the second format, and/or the third format) using Oracle smart city software.

The data unifier program 202 is configured to receive the information 122 contained in formats A, B, C, and D, respectively, and then combine the differently formatted information into one unified format. For example, the information 122 may not be structured and presented in the same manner given that they are offered by different companies. As such, the data unifier program 202 may ingest the information 122 and generate the unified data format 204. In some instances, the format of the unified data may be determined by the publishers, the subscribers, a central authority (e.g., the platform 102), and so forth. Here, the benefit is that the data unifier program 202 may present disparate sensed building information, environment conditions, utility information, and so forth from a myriad of sources, to the platform 102 in one easily digestible format. Since the platform 102 may ingest the information 122 easily for distribution to the platform 102 subscribers and publishers, such subscribers and publishers will be able to retrieve and use such information more efficiently and productively.

Additionally, by aggregating the information 122 from disparate sources, the unified data format 204 may be consumed subscribers. In other words, real-time event data from disparate organizations' devices and/or sensors, or devices of the general public, may be streamed and/or uploaded to the platform 102 where the data unifier program 202 fits data to schema consistency (i.e., a unified format). Thereafter, a data aggregator can be applied that aggregates and synchronizes data event streams based on time stamp or data time of arrival, or some other synchronization mechanism, and presented via the platform 102. As an illustration, universities may act as publishers of utility information relating to utilization of utilities during a certain timeframe and/or season. Here, the universities may wish to have their utility information unified into a single format, but also only aggregated and grouped together for a certain seasons, such as summer, for example. In other words, information from devices and/or sensors that measure utility information may be combined or grouped with information from devices and/or sensors that measure weather, such that the information for the disparate devices and/or sensors are combined and related to one another.

FIGS. 3A-5 illustrate the benefits of a blockchain enabled environment in which the platform 102 may utilize to store de-sensitized, or scrambled, private and/or sensitive publisher information, and/or private and/or sensitive publisher information, while at the same time providing enough information detail to be useful to at least smart city solution providers. However, the blockchain is not limited to this, and it may also be used as a transaction ledger of transactions which have transgressed during the life of the platform 102, or even used as to provide an interface for digital services/interaction with data.

Users of the platform 102, such as the publishers and the subscribers, are able to access a blockchain, through a node of the blockchain network and verify the source of information. For example, a blockchain block may store a unique identifier of a publisher without revealing any sensitive or private information about such publisher. As such, a subscriber or publisher may be able to go to a blockchain and verify that the information obtained matches the source characteristics (e.g., office building larger than 20,000 square feet, with more than 200 occupants). In some instances, each node with the blockchain network may store its own copy of the ledger of the blockchain, and once a subscriber obtains an immutable ledger from the blockchain, any future tampering of prior blocks will be recognized by this subscriber and thus will be known to be fraudulent.

In some instances, a semi-permissioned blockchain is used by the platform 102 to provide a single source of truth concerning data verification by the publisher and/or subscriber. As such, in an example, a blockchain would be semi-permissioned because the platform 102 may be the only node which can post blocks to the blockchain and the subscribers and publishers are only allowed to read the blocks. In this scenario, the subscribers and/or the publishers are assured that the likelihood of tampering with the blocks are slim since the platform 102 is potentially the only node within the blockchain network that is posting blocks to the blockchain.

However, this type of blockchain may also be based on a consensus algorithm such as a proof of stake or a byzantine type of consensus algorithm. For example, in proof of stake, the nodes with the most stake in the blockchain can post blocks. In an example smart city data exchange, the nodes which gain the most benefit from use of the blockchain would be provided the ability to post blocks, while others may be restricted. The reasoning is that the nodes with a higher stake would not sabotage themselves and/or tamper the blockchain by posting inaccurate fraudulent blocks.

In one example byzantine consensus method, the platform 102 may choose so-called general nodes who are the only nodes that may post blocks to the blockchain. Here, the platform 102 may rely on certain nodes that that the platform 102 trusts, called generals, and thus reduce the risk or fraud and/or other bad tampering of blocks by being able to monitor and choose who are the generals.

From another perspective, while some examples may utilize a semi-permissioned blockchain, it is understood that a traditional proof-of-work consensus algorithm blockchain, which is described partially below in detail, may be enacted to create a smart city solution. For example, all nodes in an example blockchain network solution may be deemed a miner and thus have to guess a nonce to post blocks on the blockchain utilizing the proof-of-work consensus algorithm described above.

Figure 3A:
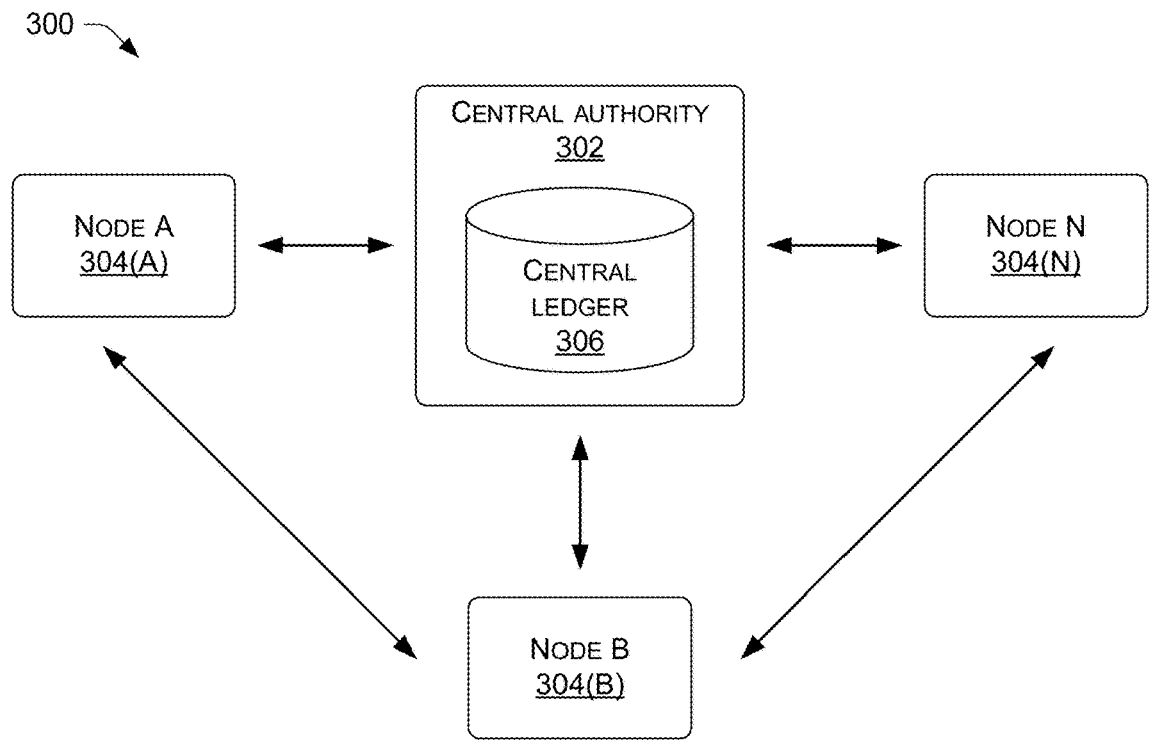
FIG. 3A illustrates an example diagram showing a centralized database system, according to examples of the present disclosure.

FIG. 3A illustrates a centralized database system 300 in accordance examples of the present disclosure. The centralized database system 300 is shown including a central authority 302, a plurality of nodes, such as node A 304(A), node B 304(B), up to node N 304(N) within a network, a central ledger 306, and a plurality of network connections that communicatively couple components of the centralized database system 300.

In some instances, from time to time, one of the nodes, for example, node A 304(A), issues a request to the central authority 302 associated with performing an action on data stored in the central ledger 306. In some instances, the request may be a request to create, read, update, or delete data that is stored in the central ledger 306. As the central authority 302 receives the request, which may be from a publisher and/or a subscriber, the central authority 302 processes the request, makes any necessary changes to the data stored in the central ledger 306, and informs the requesting node (e.g., node A 304(A)) of the status of the request. Additionally, the central authority 302 may also send out status updates to the other nodes on the network about the change made, if any, to the data by node A 304(A). Within the centralized database system 300, all interaction with the data stored in the central ledger 306 occurs through the central authority 302 such that the central authority 302 functions as a gatekeeper of the data.

The central authority 302 operates as a single point of entry for interacting with the data. Consequently, the central authority 302 represents a single point of failure for the entire centralized database system 300. To this end, if the central authority 302 is not accessible to the nodes in the centralized database system 300, then the data stored in the central ledger 306 is not accessible to the nodes. In another example, each individual node may maintain their own databases. In this example, at the end of the day, for example, each node may send a copy of their respective database to the central authority 302. The central authority 302 may then reconcile the received databases to form a single cohesive record of the data stored in the central ledger 306.

Figure 3B:
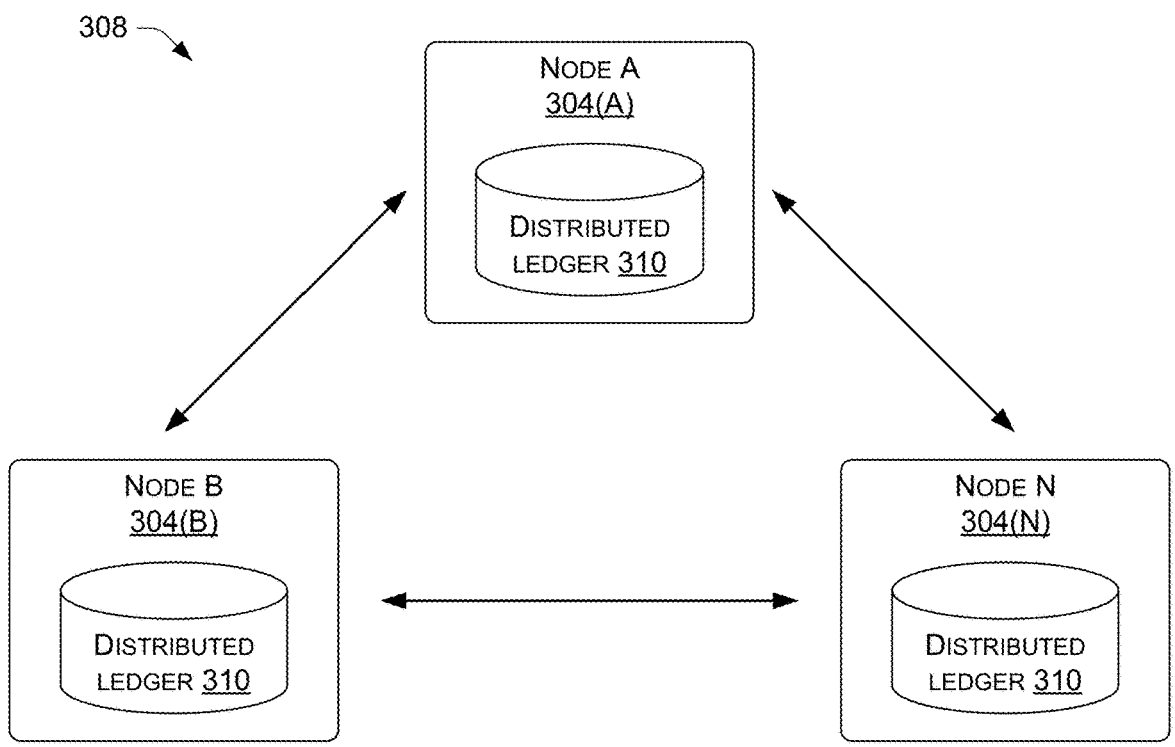
FIG. 3B illustrates an example diagram showing a distributed ledger system, according to examples of the present disclosure.

Conversely, FIG. 3B depicts a distributed ledger system 308 in accordance with examples of the present disclosure. The distributed ledger system 308 may be representative of the blockchain system described above. For example, FIG. 3B illustrates that the distributed ledger system 308 includes the plurality of nodes, such as the node A 304(A), the node B 304(B), up to the node N 304(N) within the network, a distributed ledger 310, and a plurality of network connections that communicatively couple components of the centralized database system 300. As shown, in the distributed ledger system 308, each node maintains a copy of the distributed ledger 310. As changes are made to the distributed ledger 310, each node updates their respective copy of the distributed ledger 310. For example, a consensus mechanism (e.g., proof of work, proof of stake, Byzantine methods, etc.) may be used by the nodes in the distributed ledger system 308 to determine how and when to make changes to the distributed ledger 310.

Therefore, each node has their own copy of the distributed ledger 310, which is identical to every other copy of the distributed ledger 310 stored by the other nodes in the network. In some examples, the distributed ledger system 308 may be more robust than a central authority database system, as introduced above in FIG. 3A, as the distributed ledger system 312 is decentralized. As such, there is no single point of failure.

Figure 4A:
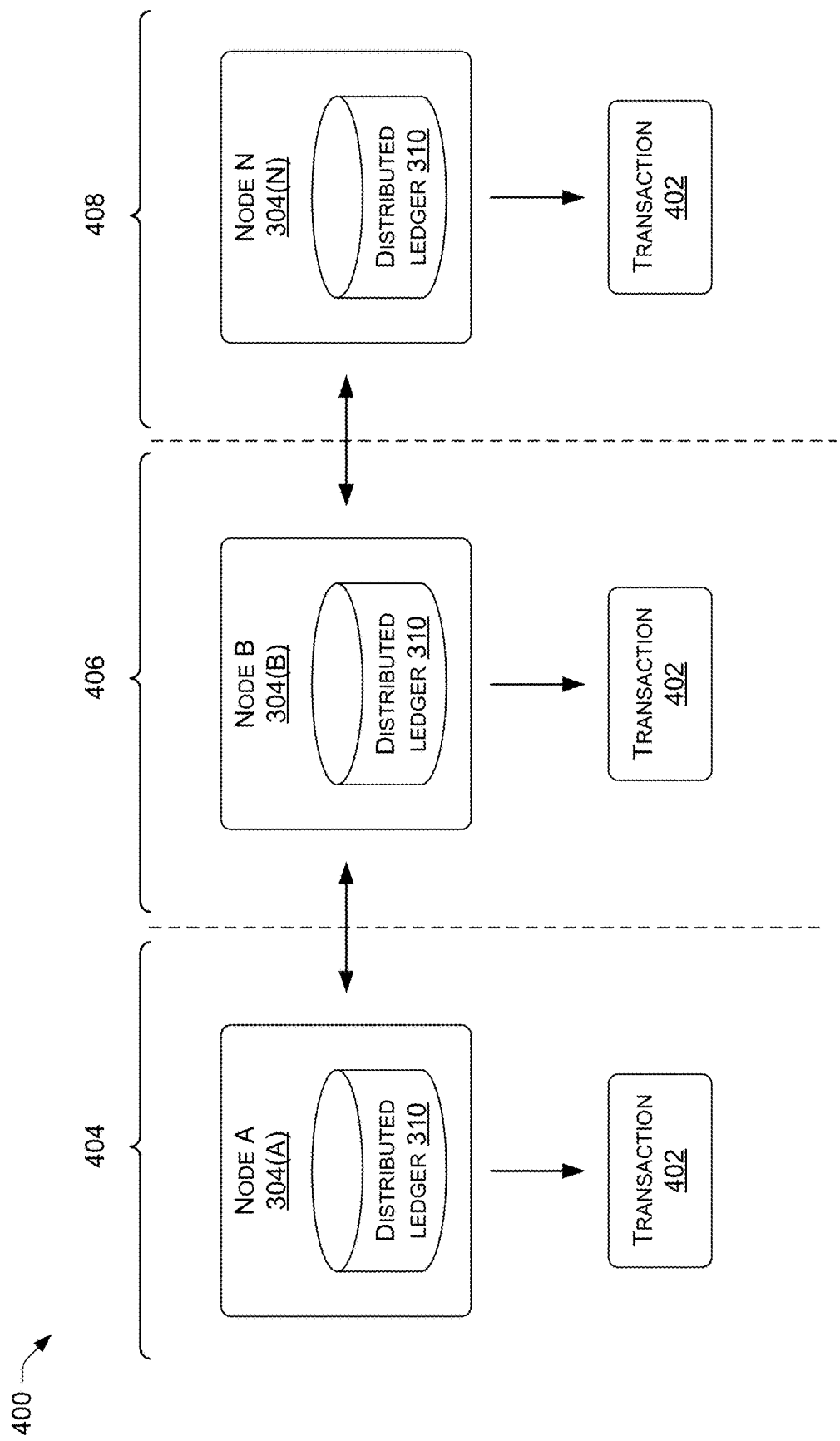
FIG. 4A illustrates an example diagram showing a blockchain transaction flow, according to examples of the present disclosure.

FIG. 4A depicts an example transaction flow 400 in accordance with examples of the present disclosure. FIG. 4A includes a transaction 402, three different time frames 404 (a first timeframe), 406 (a second timeframe at least partially after the first timeframe), and 408 (a third timeframe at least partially after the second time frame), a set of nodes, such as the node A 304(A), the node B 304(B), up to the node N 304(N) within the network, the distributed ledger 310, and a plurality of network connections that communicatively couple components of the network together. In some instances, the transaction flow 400 may represent a sequential flow of a transaction through a network, such as the network depicted in FIG. 3B. For example, at time 404 node A 304(A) may generate a transaction 402.

In some instances, the transaction 402 may use data that is stored in the distributed ledger 310, or the transaction 402 may use data received by the node A 304(A) external to the distributed ledger 314. The node A 304(A) may transmit the newly generated transaction to node B 304(B) via a network connection. At time 406, the node B 304(B) receives the transaction 402 and confirms that the information contained therein is correct. For example, the node B 304(B) may compare the transaction to information stored in the distributed ledger 310. If the information contained in the transaction 402 is not correct, then the node B 304(B) may reject the transaction 402 and as a result, may not propagate the transaction 402 through the network (e.g., to node N 304(N)). However, if the information contained in the transaction 402 is correct, then the node B 304(B) may transmit the transaction 402 to the network (e.g., to node N 304(N)).

At time 408, the node N 304(N) may receive the transaction 402 and either confirm or reject the transaction 402, similar to the process described above. In some instances, the node N 304(N) may not transmit the transaction 402, if confirmed, given that there are no further nodes to transmit to, and/or all of the nodes in the network have already received transaction 402.

In some instances, at any of timeframes 404, 406, and/or 408, any of the nodes may add the confirmed transaction 402 to their copy of the distributed ledger 310, or to a block of transactions stored in the distributed ledger 310. In some instances, confirming the transaction 402 includes checking cryptographic key-pairs for participants involved in the transaction 402. In some instances, checking the cryptographic key-pairs may follow a method laid out by a consensus protocol, such as the consensus protocol discussed in FIG. 3B.

Figure 4B:
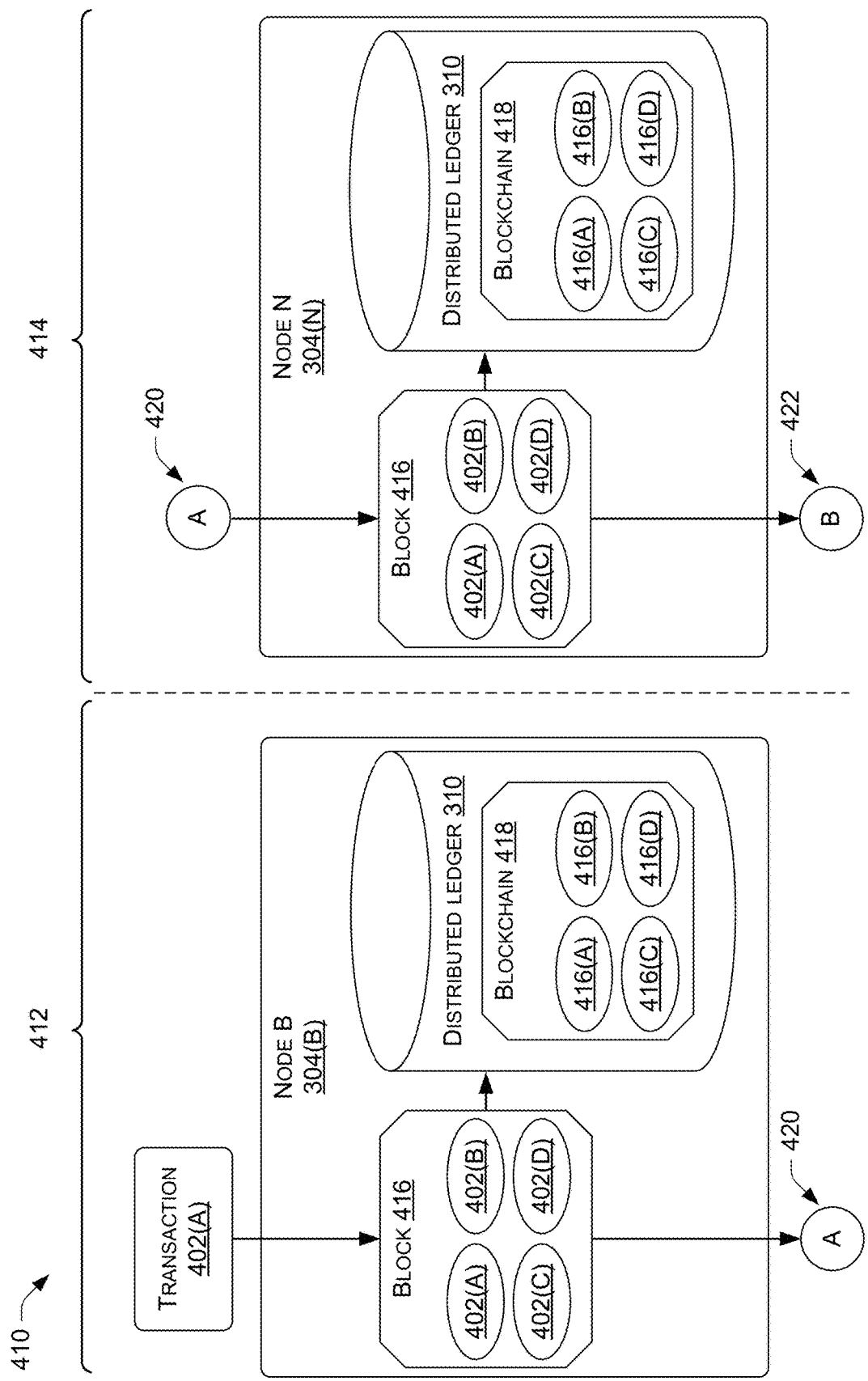
FIG. 4B illustrates an example diagram showing a blockchain propagation flow, according to examples of the present disclosure.

FIG. 4B illustrates an example block propagation flow 410 in accordance with examples of the present disclosure. FIG. 4B includes two time frames 412 and 414, node B 304(B) and node N 304(N), a set of transactions 402(A)-402(D), a set of blocks of transactions 416(A)-416(D), a distributed ledger 310, and a blockchain 418. The block propagation flow 410 may follow the blockchain system described above or may follow another blockchain propagation algorithm.

The block propagation flow 410 may begin with node B 304(B) receiving a transaction 402(A) at time 412. When node B 304(B) confirms that the transaction 402(A) is valid, the node B 304(B) may add the transaction 402(A) to a newly generated block 416. As part of adding the transaction 402(A) to the block 416, the node B 304(B) may solve a cryptographic puzzle (e.g., in a proof-of-work consensus algorithm) and include the solution in the newly generated block 416 as proof of the work done to generate the block 416. This proof of work may be similar to the proof of work described above which utilizes guessing a nonce value. In other instances, the transaction 402(A) may be added to a pool of transactions until a sufficient number of transactions in the pool exist to form a block. The node B 304(B) may transmit the newly created block 416 to the network at 420. Before or after propagating the block 416, the node B 304(B) may add the block 416 to its copy of the blockchain 418.

At the time 414, the node N 304(N) may receive the newly created block 416. The node N 304(N) may verify that the block of transactions 416 is valid by checking the solution to the cryptographic puzzle provided in the block 416. If the solution is accurate, then node N 304(N) may add the block 416 to its blockchain 418 and transmit the block 416 to the rest of the network at 422, if any.

Figure 5:
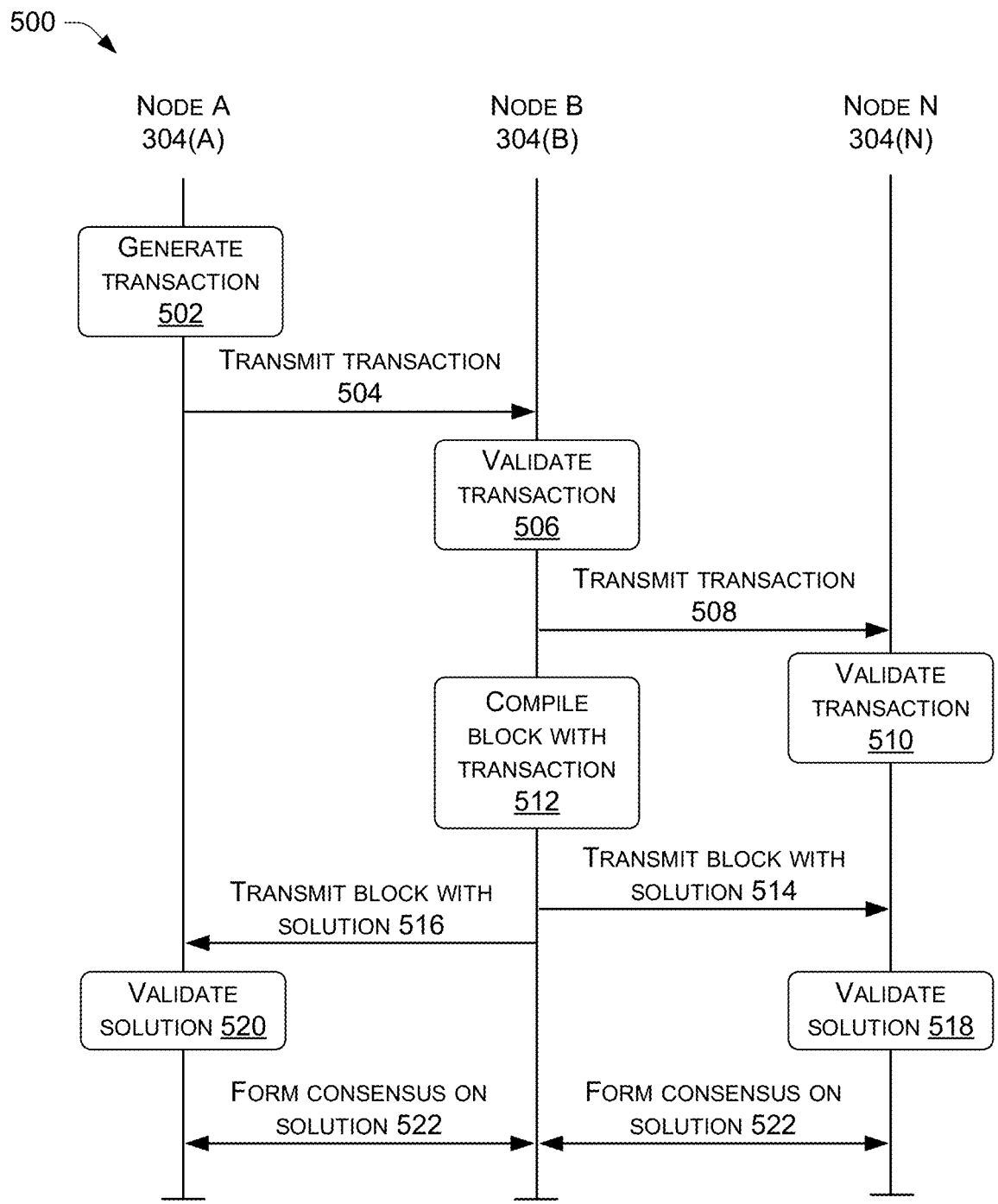
FIG. 5 illustrates an example diagram showing a blockchain sequence, according to examples of the present disclosure.

FIG. 5 illustrates an example diagram 500 in accordance with examples of the present disclosure. A set of nodes, node A 304(A), node B 304(B), and node N 304(N) are shown. At 502, the node A 304(A) may generate a transaction. At 504, the node A 304(A) may transmit the transaction to the node B 304(B). At 506, the node B 304(B) may validate the transaction, and, if the transaction is valid, transmit the transaction at to the node N 304(N) at 508. The node N 304(N) may validate the transaction at 510. At 512, node B 304(B) may compile a block including the validated transaction. In some instances, compiling a block may include generating a solution to a cryptographic puzzle, and linking the block to other blocks, as described in the embodiments above. Once the block is compiled, the node B 304(B) may transmit the block with the solution at 514 to the node N 304(N) and transmit the block with the solution at 516 to the node A 304(A). In some instances, 514 and 516 may be performed in parallel or series.

Both the node N 304(N) and the node A 304(A) may then validate the solution to the block at 518 and 520, respectively. In some instances, validating the solution may include checking a cryptographic key-pair as described above. At 522 the three nodes form a consensus that the solution is valid, thereby forming a consensus on the blocks of transactions stored by all the nodes.

As described above, some embodiments of this disclosure may utilize a semi-permissioned blockchain where the platform 102 is the only node which may post blocks to the blockchain. Alternatively and/or additionally, the platform 102 may also assign certain nodes as the only nodes that may post blocks, like in a byzantine type consensus algorithm. This type of blockchain setup may ensure added security and trustworthiness to the posted blocks. As such, the publishers and the subscribes, which may have read-only access to the blocks, can be assured that there is a small likelihood with tampering of the blocks and thus can rely on the de-identified sensed building information reported on the blockchain identifying a source of the information potentially stored on a third party could service.

Figure 6:
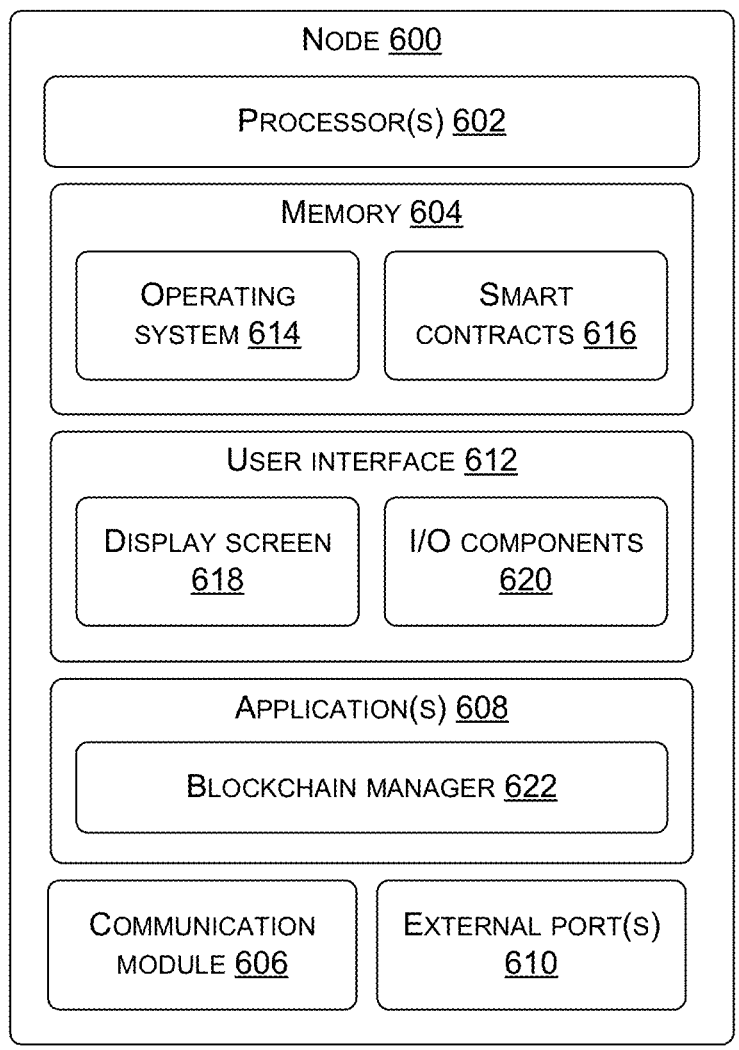
FIG. 6 illustrates an example diagram showing a blockchain node, according to examples of the present disclosure.

FIG. 6 depicts a node 600 in accordance with examples of the present disclosure. In some instances, the node 600 may be representative of the node A 304(A), the node B 304(B), and/or the node N 304(N). The node 600 may be capable of performing the functionality disclosed herein. In particular, the node 600 may be utilized in the decentralized system 308 described in FIG. 3B, the flows of transactions and blocks described in FIGS. 4A and 4B, and/or the blockchain system 700 described in FIG. 7 below.

The node 600 may include at least one processor 602, memory 604, a communication module 606, applications 608, external ports 610, and/or a user interface 612. The memory 604 is shown storing or having access to an operating system 614 and smart contracts 616. The user interface 612 is shown including or being associated with a display screen 618 and input/output (I/O) components 620. Additionally, the application(s) 608 are shown including a blockchain manager 622.

In some instances, the node 600 may generate a new block of transactions or may broadcast transactions to other nodes in a network using the blockchain manager 622. Similarly, the node 600 may use the blockchain manager 622 in conjunction with the smart contracts 616 stored in the memory 604 to execute the functionality disclosed herein. However, in some instances, the smart contracts 616 may operate independent of the blockchain manager 622 and/or other applications. Moreover, in some instances, the node 600 may not include the blockchain manager 622 and/or the smart contracts 616. For example, the blockchain manager 622 and/or the smart contracts 616 may be stored elsewhere.

The node 600, as part of the decentralized ledger system 312, or another decentralized or centralized network, may be used as part of systems that interact with and/or manipulate data and transactions associated with showing a proof of source of the information shared on the platform 102. As stated above, the intent of having a proof of source is for subscribers to know that the de-identified information they receive are from the types of entities and individuals in which the information is advertised to be from (e.g., university, financial institution, factory, etc.), while at the same time, allowing publishers to make their information public while not sharing any private, confidential, secure, or like information which the publishers do not want to be released in a public setting.

Although certain components of the node 600 are illustrated and described, the node 600 may have additional, different, and/or less components. The components of the node 600 are described in more detail below.

Figure 7:
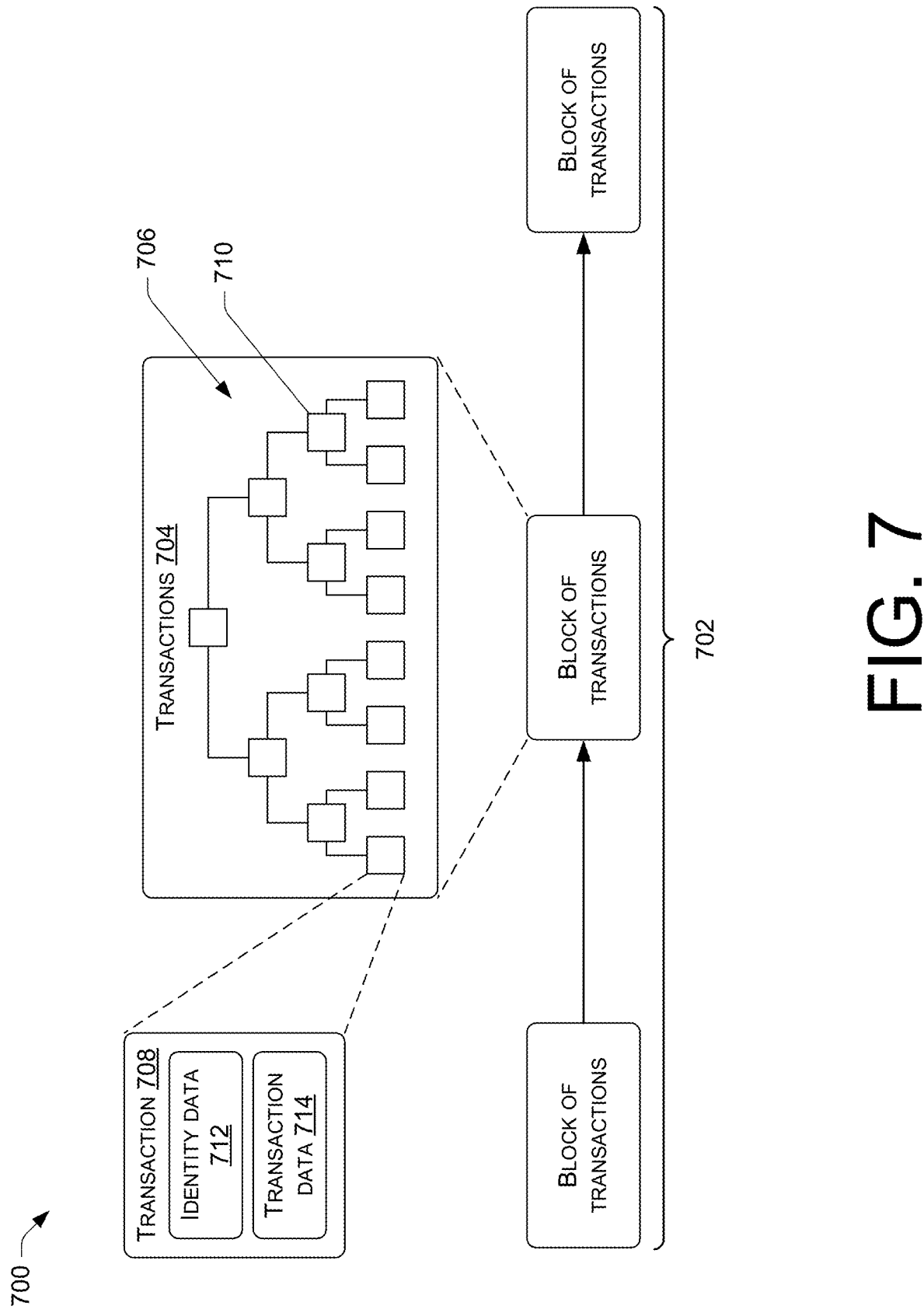
FIG. 7 illustrates an example diagram showing a blockchain system, according to examples of the present disclosure.

FIG. 7 illustrates an example blockchain system 700 in accordance with examples of the present disclosure. The blockchain system 700 includes a blockchain 702, a block of transactions 704, a Merkle Tree 706, and a transaction 708 (among the block of transactions 704). In some instances, the blockchain system 700 may include a plurality of blocks 710 connected together to form the block of transactions 702. In some instances, each block of transactions 704 may include at least one transaction 708. In other embodiments, each block of transactions 704 may have a size limit that necessarily limits the number of transactions that the block 710 may store. In some instances, each block of transactions 704 may include a reference to a previous block of transactions that was added to the blockchain 702 prior to the block of transactions 704 being added to the blockchain 702. As such, and as described above, each block of transactions 704 may be linked to every other block 710 in the blockchain 702.

In some examples, the block of transactions 704 may organize the transactions it has received into the Merkle Tree 706 to facilitate access to the stored transactions. The Merkle Tree 706 may be the type of Merkle Tree that cryptographically links the block of transactions 704 together. The transactions 708 may be hashed using a cryptographic hash algorithm, such as the algorithms discussed above, and the hash of each transaction 708 may be stored in the Merkle Tree 706. As the Merkle Tree 706 is constructed, the hash of each adjacent node at the same level may be hashed together to create a new node that exists at a higher level in the Merkle Tree 706. Therefore, the root of the Merkle Tree 706, or the node at the top of the Merkle Tree 706, may be dependent upon the hash of each transaction 708 stored below in the Merkle Tree 706. However, although a particular organization of the blocks 710 are shown, in other instances, the blockchain system 700 may utilize a different method of organizing the transactions 704.

Each transaction 708 may include or be associated with identity data 712 and/or transaction data 714. The identity data 712 may include identifying data for the transaction 708, while the transaction data 714 may identify the nature of the transaction 7080 and what the transactions 708 entails, such as input and output addresses, a transaction value, a document hash value, a timestamp, a transaction fee value, etc.

In some instances, documents stored "on" the blockchain 702 are documents that have been hashed according to a cryptographic hashing algorithm (e.g., SHA-256) and the resulting output hash has been included in a transaction in a block that has been accepted by the network nodes as satisfying the consensus rules of the blockchain 702. As such, the documents may be later verified or validated by comparing the hash of the documents to the hash stored on the blockchain 702. For example, if a set of documents results in a SHA-256 hash that was recorded on the blockchain 702 at a certain date, then the blockchain 702 provides cryptographic proof that the documents existed as of that date.

One way of storing a document on the blockchain 702 is to broadcast the transaction 708 including a hash of the document to the network, which may be included in a block if the transaction 708 satisfies all of the consensus rules of the network. In some instances, the blockchain 702 is a permissioned ledger, or semi-permissioned ledger, meaning only authorized network participants (e.g., publishers and subscribers) may broadcast the transactions 704.

Alternatively, in some instances, only some authorized network participants may make the transactions 704. For example, if only certain network participants are authorized to broadcast the transactions 704 or add the blocks 710 to the blockchain 702, then one of the consensus mechanism of the network may be a proof-of-identity. One consensus mechanism may include a proof-of-identity of an entity broadcasting a transaction to the blockchain 702, or adding a block to the blockchain 702, is for the entity to cryptographically sign a message to prove an identity of the entity.

Another consensus mechanism is proof-of-stake. In this consensus mechanism, nodes with the most stake in the blockchain 702 are the nodes that are allowed to post new blocks 710 to the blockchain 702. For example, in a cryptocurrency blockchain, the nodes with the most cryptocurrency may be the nodes that are allowed to post new blocks to the blockchain 702. Here, it may be reasoned that the nodes with the most stake in the blockchain 702 are the ones to be trusted with posting new blocks 710 since nodes with a greater share of a cryptocurrency, in a cryptocurrency driven blockchain, can be awarded a greater percentage of transaction fees which may be a pro-rata share associated with their stake in the blockchain (i.e., the more cryptocurrency owned means a greater share of the transaction fee). As another consensus mechanism, Byzantine methods may only allow trusted nodes, that may be called "generals," to post blocks to the blockchain. Generals may be chosen through a variety of methods which the creators of a blockchain may decide upon during creation of such blockchain network.

In some instances, an authorizing body may publish public cryptographic keys associated with network participants authorized to make certain changes to the blockchain 702. For example, an authorizing body may publish public cryptographic keys owned by the publishers. The authorizing body may issue the private cryptographic keys to authorized publishers. Alternatively, or additionally, the publishers may independently generate public/private cryptographic key pairs, and then provide the public key to the authorizing body for publication. The same may be applied to subscribers to the platform when they seek cryptographic protection.

Validating network nodes may verify that the signed transaction or signed message was signed by the private cryptographic key corresponding to the published public cryptographic key owned by the publishers or subscribers or any person/entity who may wish to seek cryptograph protection. In another implementation, no central authorizing body publishes a list of entities authorized to broadcast a transaction or add a block, but a broadcasting entity may still include a proof-of-identity in a transaction. As such, it may not be necessary to maintain a published list of entities and validate those entities with every new transaction or block because the identity of the broadcasting entity is recorded immutably on the blockchain, and may be verified at a later time if needed.

Figure 8:
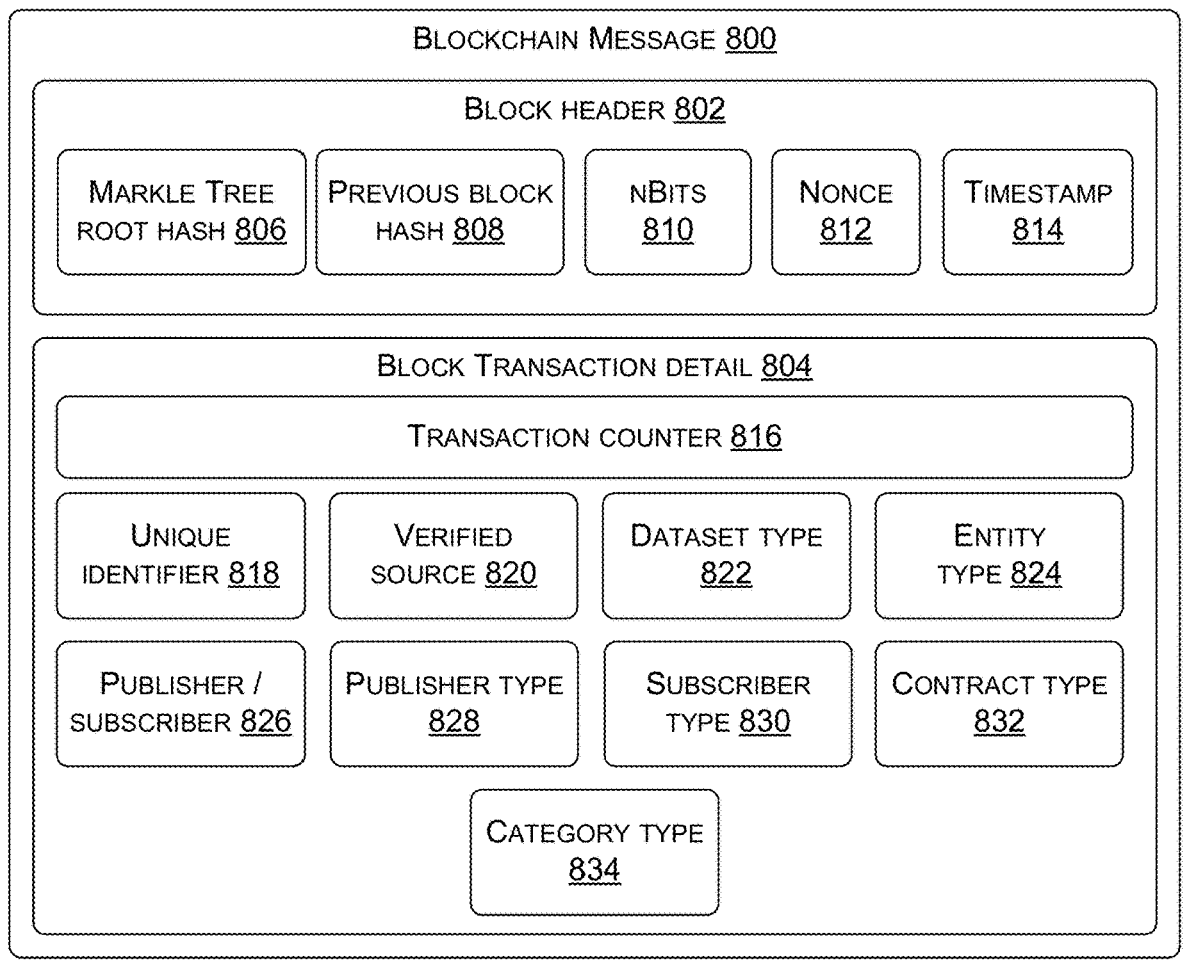
FIG. 8 illustrates an example diagram showing a blockchain message, according to examples of the present disclosure.

FIG. 8 illustrates an example blockchain message 800 in accordance with examples of the present disclosure. The blockchain message 800 may be posted to a blockchain network in support of the platform 102. The blockchain message 800 includes a blockchain header 802 and block transaction details 804 that provides the details of the transactions associated with that particular block.

The blockchain header 802 may include components of Markle Tree Root hash 806, a previous block hash 808, nBits 810, nonce 812, and timestamp 814. The Markle Tree Root hash 806 may be a hash of the transactions in a block. For example, the transactions may be hashed and summarized utilizing a trusted hashing algorithm, such as SHA-256. Such hashing may allow an entity to review the transactions and ensure that the transactions sum up to the hash. This may ensure that the transactions in the block were not tampered with and are trustworthy. If the transactions do not sum up to the root hash, then it is likely that either the transactions were changed, or the hash was changed, or both. As such, this type of hashing assists in the immutability of transactions in a blockchain.

The previous block hash 808 may be a hash assigned to the block directly before the current block (or a block in question). This is the essence of blockchain given that as each block is connected to the prior block, by recording a previous hash, creating a chain of blocks interconnected to one another, except for the first block named the genesis block. The nBits 810 may relate to the difficulty used to create the block. The difficulty in creating a block, at least in a proof-of-work consensus algorithm, relates to the difficulty that miners face in guessing a nonce, if there are too many miners on a blockchain network, the network may increase the difficulty in order to match the number of miners on the network.

The nonce 812 is optional and usually may be only used for proof-of-work consensus algorithms. The nonce 812 is the random number that miners have to guess in order to post a block and be awarded a transaction fee, and maybe even cryptocurrency tokens if the blockchain network is setup according to such. As explained above, typically a blockchain utilizing a proof-of-work consensus algorithm utilizes a nonce value but other consensus algorithms such as proof-of-stake, may not utilize a guessed nonce value. The timestamp 814 may relate to the date and time of when the block was created.

The block transaction detail 804 may include components of transaction counter 816, unique identifier 818, verified source 820, dataset type 822, entity type 824, publisher/subscriber 826, publisher type 828, subscriber type 830, contract type 832, and/or category type 834. The transaction counter 816 may relate to the number of transactions within the posted block. For example, a block may contain more than one source identifier information for more than one platform publisher. In other blockchain implementations, the transaction counter 816 may relate to the number of total transactions on the blockchain. As it is clear to a person of ordinary skill in the art, components and modules may be added, deleted, and/or re-arranged in any order to deliver a blockchain solution which makes sense in order to solve the current issue or create a current solution.

The unique identifier 818 may be used to identify the subscriber or publisher without publicizing, on the blockchain network, that subscriber or publisher true identity. For, example, Tyco Utilities Company may want to be a publisher on the platform 102, giving their measured usage of gas, water, electricity, and maybe even air quality, sensed by IoT devices and/or other sensors that are fed into a network. This sensor data ultimately feeds into the platform 102 for distribution and potentially stored on a cloud provider. However, the platform 102 may give Tyco Utilities Company a unique identifier of 145CC, and instead of posting Tyco's real name, in order to protect Tyco Utilities Company identify while still allowing subscribers to verify that Tyco is a utility company with certain characteristics, and thus, trust that the information is coming from a utility company. In some instances, the unique identifier 818 may be stored on the platform 102 and mapped to the actual information of the entity. For example, the platform 102 may have a matrix table, or similar mechanism, which maps the unique identifier 818 back to the entity name and/or identifying information which is hidden from subscribers. In this matrix table, 145CC may be shown to be associated with Tyco Utilities Company and their contract with the platform 102.

The verified source 820 may represent a value of whether an authorizing body, like a government entity, or a trust verification service, or even the platform 102, verified the publisher or subscriber as to who they say they are. For example, using the example above, a government entity may verify that Tyco is, in fact, a utility company and not a scammer and/or imposter pretending to be Tyco, and/or whether Tyco in fact a utility company. The same logic can be applied to verify any other type of entity, like a financial institution or public education entity like a state college.

This verification may help a subscriber trust the sensor data they are receiving from the platform 102, due more so to the fact that a publisher's true identity may be hidden with the only a unique identifier presented to the subscriber.

The dataset type 822 may be used to identify the type of information which a publisher releases to be shared on the platform 102. For example, IoT devices and/or sensors may be identified as external devices which track external measurement of phenomena like air quality, wind speed, pressure, or any other external phenomena which may be beneficial to a smart city. On the other hand, the dataset type 822 may be used to identify internal IoT devices and/or sensors which are placed inside buildings to detect phenomena such as measurement of sunlight incoming into the building, or the number of people who enter and leave a building in a given day, gas usage, the water usage, electricity usage, the number of people entering and leaving a building and at what times and also people flow by the time of year like which yearly quarter has the most incoming people or the least incoming people, and/or or any other relevant measurement.

The entity type 824 may be used to identify a type of entity associated with the publisher or subscriber. For example, the entity type 824 may identify that a building is used for recreational sports, such as rock climbing. As such, any measurements, like electricity, gas, water, and so forth may be recorded and categorized into buildings that are used for recreational sports.

Publisher/subscriber 826 may be used by the platform 102 to identify whether an entity is a publisher, subscriber, or both. Such designation may play a factor in how such entity is charged. For example, a publisher may be charged a lower rate to access data than a subscriber, since the publisher is offering their information to be accessed by others on the platform 102. Alternatively, a subscriber, who does not publish information and is only receiving information from others, may be charged a higher rate for accessing information.

The publisher type 828 maybe used to identify a type of publishing of the publisher. For example, a publisher may only be recognized as publishing data within the Northeast region of the United States rather than nationwide. Again, such designation may affect the contract rate of items the publisher has with the platform 102 because of that publisher's total participation, and contribution, to the platform 102 which may help create a smart city solution. The subscriber type 830 may be used in the same manner as the publisher type 828, however, the subscriber type 830 may be viewed from the perspective of a subscriber. For example, a subscriber may only request to receive information from publishers in the Northeastern region of the United States, and thus, their contract rate to receive information from publishers may be lower than a subscriber who receives national information.

The contract type 832 may be used to identify the type of contract an entity (e.g., publisher or subscriber) has with the platform 102. For example, a subscriber may have a A4 type contract where such type of contract only allows the subscriber to receive the information from education entities from the West Coast of the United States. This contract type 832 may also include pricing information that is standardized across entities of the platform 102.

The category type 834 may be used to further identify the sensed information 122 that is being shared by a publisher. For example, the category type 834 may be used to identify the type of IoT devices and/or sensors, and/or software or technical solutions, used in a smart city setup(s), like a certain build or group of buildings using Volttron technology, Cisco Kinetic technology, or even Enevo technology.

Figure 9:
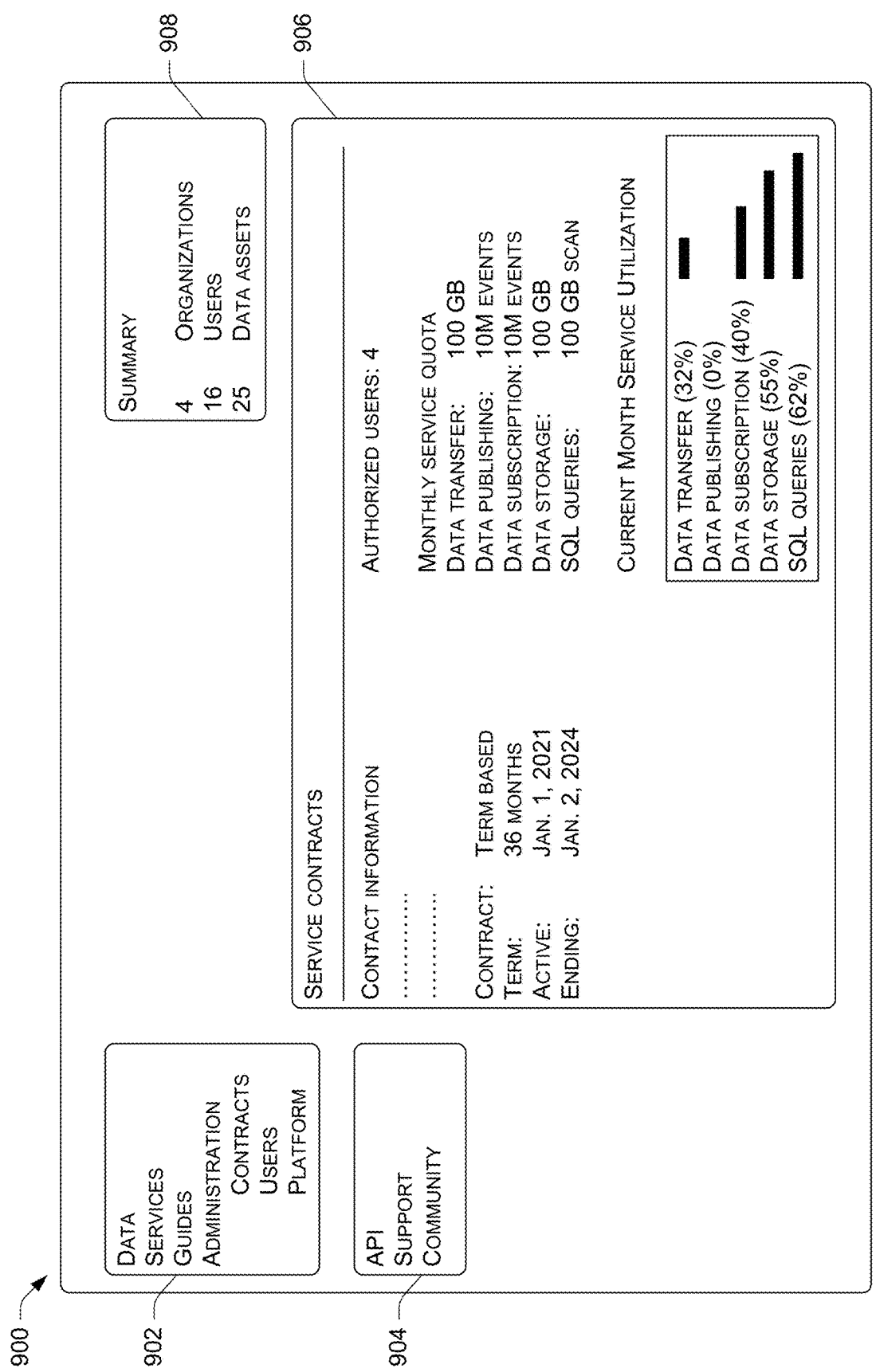
FIG. 9 illustrates an example diagram showing a data contract through a user interface, according to examples of the present disclosure.

FIG. 9 illustrates an example user interface 900 in accordance with examples of the present disclosure. The user interface 900 is shown including details about a data contract, for example, between a publisher and/or subscriber with the platform 102.

The user interface 900 may include a first section 902 that addresses the links of data, services, guides, administration, and the sub links of contracts, users, and the platform. The links of data may allow an administrator of the platform 102 to handle items are related to information under the data link. Services related items may be handled by the administrator under the services link. The guides link may be open to both administrators and users of the platform 102 (e.g., subscribers and publisher) which can provide user guide training that walks a person, step by step, on how to perform certain functions on the platform 102.

Within the sub links, the contracts link allows an administrator to get to pages where they may manage all the contracts the platform 102 is engaged with at least subscribers and publishers. The users link may allow the platform administrator to manage the access (grant and/or take away) of users of the platform 102. The platform link may allow the administrator to manage items that are related specifically to the platform 102.

A second section 904 addresses the three links of API, support, and community. The API link may allow the administrator to manage the different APIs which users of the platform 102 can tap into in order to upload and download information. The support link may allow the administrator support of the platform 102, for example, if the administrator has issues with logging on or using the user interface 900, the administrator may use the support link to get help. The community link may allow the administrator to manage the community features where publishers and subscribers may interact with each other to at least further smart city solutions.

A third section 906 of the user interface 900 shows details of service contracts. The third section 906 may include contact information that indicates an entity name, for example, Acme Supply Co. However, as noted above, such name may be different from the unique identifier (e.g., 1933CC instead of Acme Supply Co.) shared on a blockchain network in order to protect and secure Acme's privacy and/or sensitive information. The contact information may also indicate an entity type of the platform 102. For example, an entity may be a utility provider, a clothing manufacturer, or a charitable non-profit organization created to feed the homeless, and so forth. The contact information may also store a point of contact which can represent the person that is designated by an entity to be the point person to get in touch with for anything related to the platform 102. The contact information may also store an agreement that may represent what kind of contract an entity has with the platform 102. For example, an agreement field may show that an entity is publisher on the platform 102 that only shares information but does not download any information from the platform 102. Additionally, the contact information may also store a status field which may indicate whether an entity is active, inactive, pending, or any other status that is relevant to show for an entity who is a user on the platform 102.

As further shown, the third second 906 may also include contract, term, active, ending, authorized users, monthly service quota, and current month service utilization. The contract may relate to the type of contract an entity has with the platform 102 (e.g., term based). The term may entail a length of a contract, such as 12 months, 36 months, 48 months, and so forth. Active and ending may detail the current start and end date of the contract, respectively.

In some instances, authorized entities may show the number of users that are able to use the platform account associated with the entity using the platform 102. A monthly service quota provides the details of data transfer, data publishing, data subscription, data storage, and SQL queries. The data transfer may relate to the total amount of information that may be transferred in one calendar month, for example, only 100 gigabytes (GB) may be transferred in one calendar month. The data publishing may relate to the total number of publishing events that a platform entity (or user) may be engaged in, during one calendar month. For example, a platform user may engage in 10 million publishing events in total, or, in other words, may make 10 million information uploads. The data subscription may relate to the total number of subscribing events that a platform user may be engaged in, during one calendar month. For example, a platform user may engage in 10 million subscribing events in total, or, in other words, may make 10 million information pulls (requests) from the platform 102. The data storage may relate to the amount of computer memory that is allocated to a platform user (or entity), at one time, during a calendar month. For example, if a platform user has 100 GB of storage total, such user may not exceed storing information or any other kind of data in the platform 102, over that 100 GB, any time within that calendar month. The SQL queries may relate to the amount of information which may be retrieved through a SQL command, or query, within a month. For example, if a platform user has a 100 GB scan limit, the user may only run SQL queries up to the point, where, 100 GB of data, from a database, is returned to the user.

Within the third section 906, the current month service utilization may display fields of data transfer, data publishing, data subscription, data storage, and SQL queries. As can be seen, these have the same names as the fields that are presented in the monthly service quota section, however, instead of the limits of each field being shown, the actual current usage of each field is shown. For example, if data transfer utilization is shown at 32%, the platform user shown in the example in FIG. 9 has 68% of its usage left to use for the month.

A fourth section 908 of the user interface 900 shows the summaries of organizations, users, and data assets. The organizations field may show a platform administrator how many organizations are currently involved in the platform 102. The users field may show a platform administrator how many users are currently registered with the platform 102. The data assets field may show a platform administrator how many data assets currently exist on the platform 102.

The contract terms related to the platform 102, as well as any contract terms relevant due to the nature of this disclosure, may be stored and initiated automatically on a blockchain, through smart contracts. The smart contracts may be stored and initiated on the same blockchain described above, where platform users' details are scrambled but their source of truth, in terms of what type of entity they are and what type of data they share or acquire, are public. The smart contracts may automatically initiate platform related contract terms when certain conditions are met.

The execution of these smart contracts does not need to be based on any central, or governing, body, but may be solely based on whether the conditions in the code of the smart contract are achieved. For example, a smart contract may be established between the platform and a publisher, or groups of publishers, where there is an agreement to share earnings with the publishers based on the number of times the publishers' information are downloaded by the subscribers. The exact calculated earnings share, and the requirement to meet that earnings share, may be saved on a blockchain (e.g., share 2% of earnings with a publisher starting after 1,000,000 downloads by the subscribers), and nodes on the blockchain may monitor actions to see if the conditions of the smart contract are met. When it is determined that the smart contract conditions are met, the blockchain may automatically execute the code of the smart contract, in this case, starting to share profits that the platform 102 makes with the publisher, whether in a fiat currency or cryptocurrency.

Figure 10:
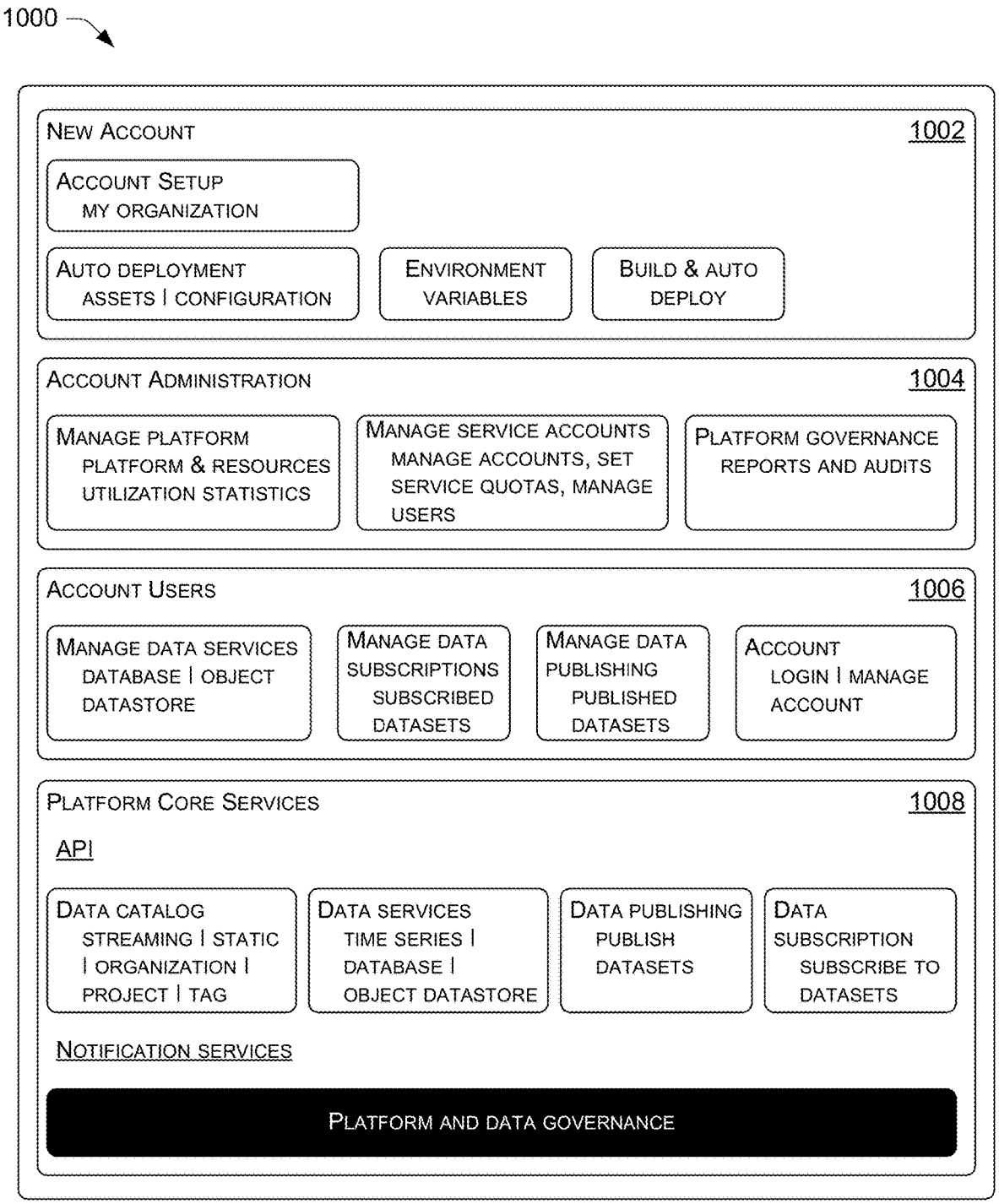
FIG. 10 illustrates an example diagram showing a data exchange platform user administration and setup through a user interface, according to examples of the present disclosure.

FIG. 10 illustrates an example user interface 1000 in accordance with examples of the present disclosure. The user interface 1000 may be associated with a data exchange platform user administration and setup. The user interface 1000 illustrates the different types of users and accounts that may be setup on the platform 102. In some instances, the user interface 1000 has sub sections of new account 1002, account administration 1004, account users 1006, and/or platform core services 1008.

In some instances, the new account 1002 section has user interface elements of account setup, automated deployment, environment variables, and build and automated deployment. The account setup user interface element may allow a platform administrator to setup a new platform user to be a publisher, subscriber, both, or any other type of user. The auto deployment user interface element may allow a certain platform account to be deployed automatically under certain conditions and/or may allow a configuration of how the automated deployment occurs. The environment variables user interface element may allow the variables of a platform user to be setup and configured to be deployed in the platform 102 for use. The build & auto deploy user interface element may allow for the creation of a new platform user account for such account to be deployed on the platform 102 in order for subscription of information or publishing of information.

In some instances, the account administration 1004 has the user interface elements of manage platform, manage service contracts, and platform governance. The manage platform user interface element allows a specific platform's resources, such as cloud storage, to be analyzed for utilization. The manage service contracts user interface element allows contracts between the platform 102 and its users to be managed to set items such as data quotas for publishers and subscribers, storage amounts, and other similar contractual items. The platform governance user interface element allows reports and audits to be run on a platform in order to make decisions on governing the nature of the platform 102.

In some instances, the account users 1006 has the user interface elements of manage data services, manage data subscriptions, manage data publishing, and account. The manage data services user interface element allows platform users' database and object datastores to be modified and/or added to suit a particular user's needs, such as, increasing or decreasing database size to accommodate storage of information used by a platform user. The manage data subscriptions user interface element may allow a platform user's subscription to different datasets for downloading, to be managed, for example, a platform user may subscribe to new datasets for download and may opt to not describe to dataset anymore because such user does not require that information. The manage data publishing user interface element may allow a platform user's published datasets to be managed, for example, a platform publisher may want to add new datasets for new types of information it wants to share with platform users in order to help create a new type of smart city solution, where, such publisher now wants to submit air quality samples to the platform where it only submitted electrical, gas, and water sampling to the platform. The account user interface element may allow a platform user's overall platform account to be managed, like, for example, a user's overall platform settings and contact information.

In some instances, the platform core services has user interface elements of data catalog, data services, data publishing, and data subscription. The data catalog user interface element may allow a platform user's to manage their information, which may be published, and decide whether information is streaming live or is static, what projects each catalog of data is participated in, and any relevant tags that have been applied to certain data catalogs. The data services user interface element may allow a platform user's database and datastore components to be managed. For example, the size of a platform user's time series database may be modified to publish certain events related to information being shared on the platform. The data publishing user interface element may allow a platform user's published datasets to be managed. For example, who is able to see such dataset and who cannot. The data subscription user interface element may allow a platform user's subscription to download platform information to be managed, for example, what kind of data subscriptions the user sees from platform subscribers and possibly even filtering seen data from a particular publisher, such as only seeing data before or after a certain date and time.

Figure 11:
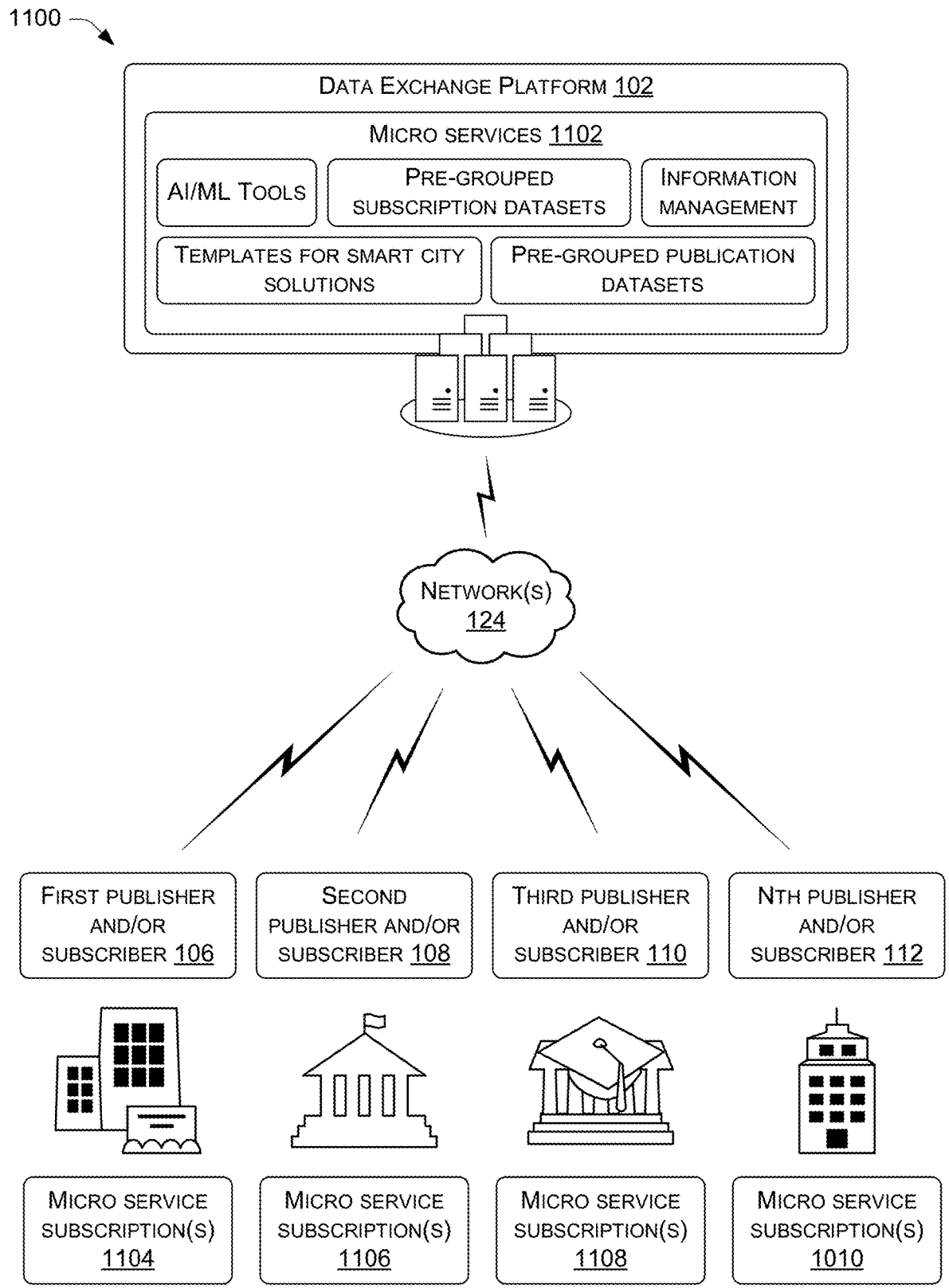
FIG. 11 illustrates an example diagram showing micro services offered by a data exchange platform, according to examples of the present disclosure.

FIG. 11 illustrates an example diagram 1100, showing example micro services being offered by the platform 102, in accordance with examples of the present disclosure.

As shown in FIG. 11, the platform 102 may offer multiple micro services 1102 to platform users such as publishers and subscribers. In a first example, an offering may be an assortment of AI/machine learning tools and analysis which may take all, or a portion of, the sensed building information stored on the platform and make predictions which can be shared with a platform user at a cost. A second example may be pre-grouped types of datasets that a subscriber may subscribe to instead of having the subscriber manually look through multiple (e.g., hundreds) datasets themselves. Here, the platform 102 may offer pre grouped datasets such as (1) sensed educational institutions in the New York City area, or (2) sensed Big Tech companies in the San Francisco Bay area.

A third example may be pre-grouped types of datasets that a publisher may publish, such as putting sensed building information into a group, for example, (1) financial institutions of the New York City area or (2) manufacturers of the Detroit area. In this third example, the pre grouped datasets for publishing may allow for a publisher to publish helpful information easier and make it easier for subscribers to utilize such publisher sensed information as the information may be already grouped in an easy to find dataset package In a fourth example, the platform 102 may offer smart city solutions to all users of the platform 102, such as offering software that gives pre-defined ways to re-time traffic signals for more efficient traffic control and congestion reduction.

In a fifth example, different types of information management services may be offered to the platform users, for example, the platform may automatically, or semi-automatically, increase or decrease the size of a platform user's database automatically due to usage history of such user's commissioned database. It should be noted that these are only examples of micro services that the Platform may offer. As such, an implementation of the platform 102 may offer more, or less, services than described in this disclosure.

The network 124 allows the described micro services to be provided to the first publisher and/or subscriber 106, the second publisher and/or subscriber 108, the third publisher and/or subscriber 110, and/or the nth publisher and/or subscriber 112. In such examples, the publishers and/or subscribers, or any users of the platform, may subscribe to micro services 1104-1110, respectively and the micro services may be provided to any of the platform 102 users over the network 124.

FIG. 12 illustrates an example diagram, showing at least a subscriber preview of a data schema through a computer user interface, in accordance with examples of the present disclosure. As shown in FIG. 12 an example platform schema download screen 1200 is shown with header details section 1202, a first asset download section 1204, and a second asset download section 1206.

In some instances, prior to mapping delivered platform information schema to a subscriber's required input format, a subscriber may perform a search for different datasets within a data catalog. For example, a subscriber may search the data catalog by looking for a dataset that comes from a certain type of organization, like a public university or private financial institution. Also, a subscriber may search by a geographic location, such as city, zip code, or a wider area like the western part of the United States. Furthermore, a subscriber may search for a specific type of sensed information like air quality measurement, gas usage, water usage, electricity usage, traffic light measurements, public transportation measurement, green roof usage measurement, waste collection management, or any other type of sensed information that a smart city may measure and obtain.

In header details section 1202, it is shown that a platform subscriber may be informed that they can preview different datasets in a data catalog and that they can further modify the schema of the incoming data format. The platform 102 may perform this data transformation and mapping before the data reaches the subscriber in order for the subscriber to ingest the platform sensed information easier.

The first asset download section 1204 shows that a solar panel asset was chosen by a subscriber. A section 1208 shows that a subscriber may take the delivered format of schema fields identifier and date-time and convert those two fields into the one field of ID-DATE. A section 1210 shows that the subscriber may take the delivered format of schema fields of electricity created, description, notes, and miscellaneous, and then convert those four fields into the one field of electricity-information.

The second asset download section 1206 shows that an air quality measuring asset was chosen by a subscriber. A section 1212 shows that a subscriber may take the delivered format of schema fields identifier and date-time and convert those two fields into the one field of ID-DATE. A section 1214 shows that a subscriber may take the delivered format of schema fields of fresh-not fresh, hcho, tvoc, pm2.5 and pm10, and then convert those five fields into the one field of Freshness-AirReadings. A section 1216 shows that a subscriber may take the delivered format of schema fields of notes and miscellaneous, and then convert those two fields into the one field of AirQualityNotes.

Although the download screen 1200 is two being related to two assets, the subscriber may select additional assets to download from the platform 102.

FIG. 13 illustrates an example diagram, showing at least a publisher preview of a data schema through a user interface, in accordance with examples of the present disclosure. As shown in FIG. 13, an example platform schema upload screen 1300 is shown with header details section 1302, a first asset upload section 1304, and a second asset upload section 1306.

The header details section 1302 shows that a publisher may upload sensed information to the platform 102 in a format which the publisher desires. The first asset upload section 1304 shows that a publisher may structure the schema of a solar panel asset, for example, to have the schema fields of identifier, date-time, electricity created, description, notes, and miscellaneous, in that order. The second asset upload section 1306 shows that a publisher may structure the schema of an air quality measuring asset, for example, to have the fields of identifier, date-time, freshnotfresh, hcho, tvoc, pm2.5, pm10, notes, and miscellaneous, uploaded into the platform 102 in that order.

Figure 14:
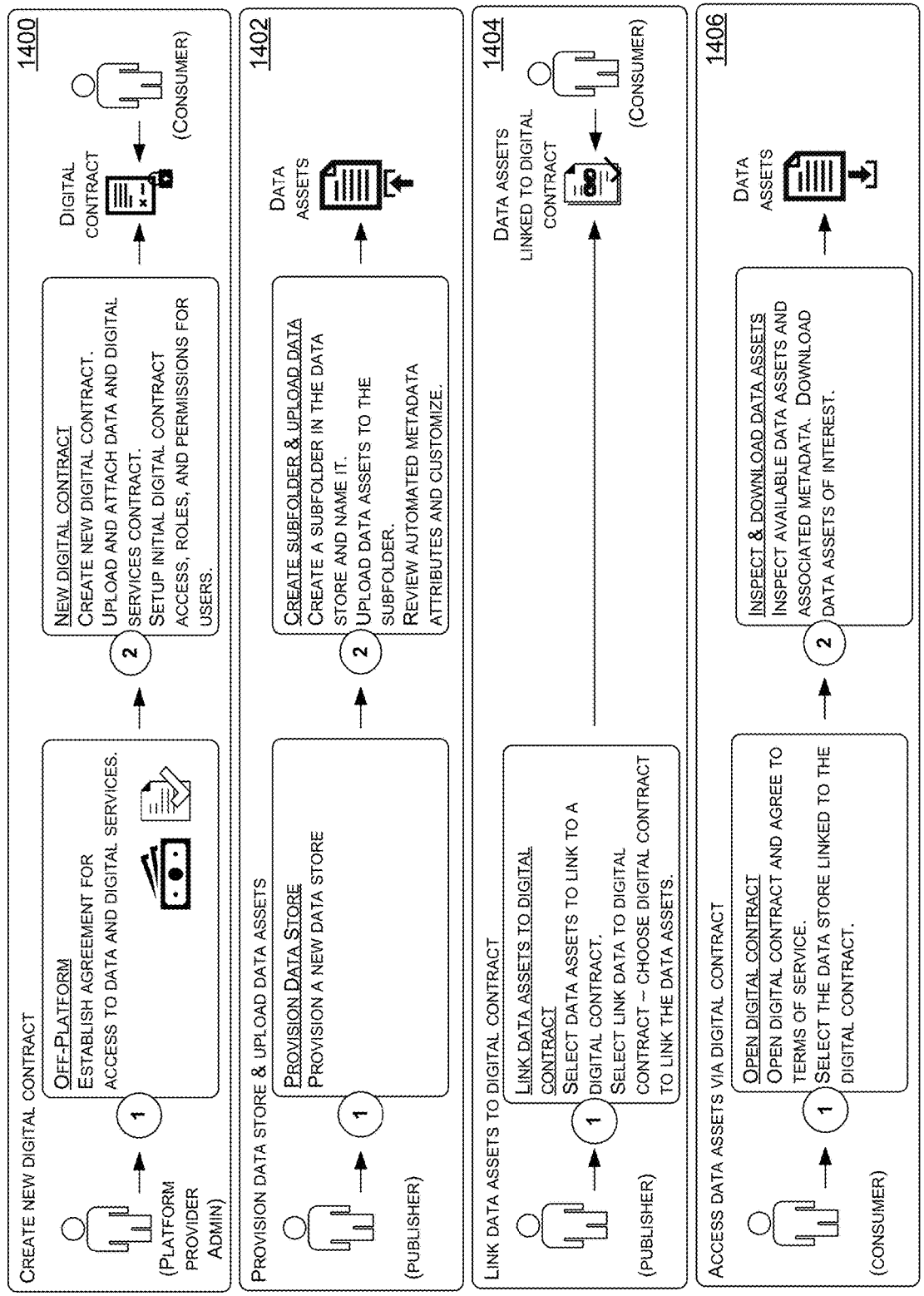
FIG. 14 illustrates example user stories that users of a data exchange platform may engage in, according to examples of the present disclosure.

FIG. 14 illustrates example user stories that platforms users may engage in, in accordance with examples of the present disclosure. FIG. 14 shows a first user story 1400, a second user story 1402, a third user story 1404, and a fourth user story 1406.

The first user story 1400 shows that a platform administrator may establish an agreement for access to the platform 102 in step 1. As shown in step 1, the contract may be for not only downloading data, but for obtaining micro services like AI/ML predictive analytics, among other services. In some instances, this agreement may be established offline. Step 2 shows that a digital contract may be created by the administrator on the platform 102 and that the contract terms agreed upon may be uploaded onto the platform 102. The administrator may proceed to, after creation of the contract on the platform 102, give the new platform user certain security access rights/roles, and/or other access to use the platform 102 as agreed upon.

The second user 1404 shows actions which may be performed by a publisher. In step 1, the publisher may provision a new data store to upload information in order to be shared. In step 2, the platform 102 may create a subfolder in the platform's memory and tag certain characteristics to that data store for that particular publisher. The administrator may further automate metadata attributes for that publisher and input custom data descriptors as appropriate.

The third user story 1404 shows how a data asset may be linked to a digital contract. In step 1, a publisher may select a data asset to link to a digital contract. The publisher may do so by going through the appropriate platform screens and choosing the data assets that are applicable to the contract.

The fourth user story 1406 shows that, in step 1, a subscriber may access information for download by agreeing to the terms and service of the platform 102 and may then search for a dataset within the platform that matches the subscriber's criteria. In step 2, the subscriber may preview and/or inspect the data assets for download and then download the data assets when ready.

Figure 15:
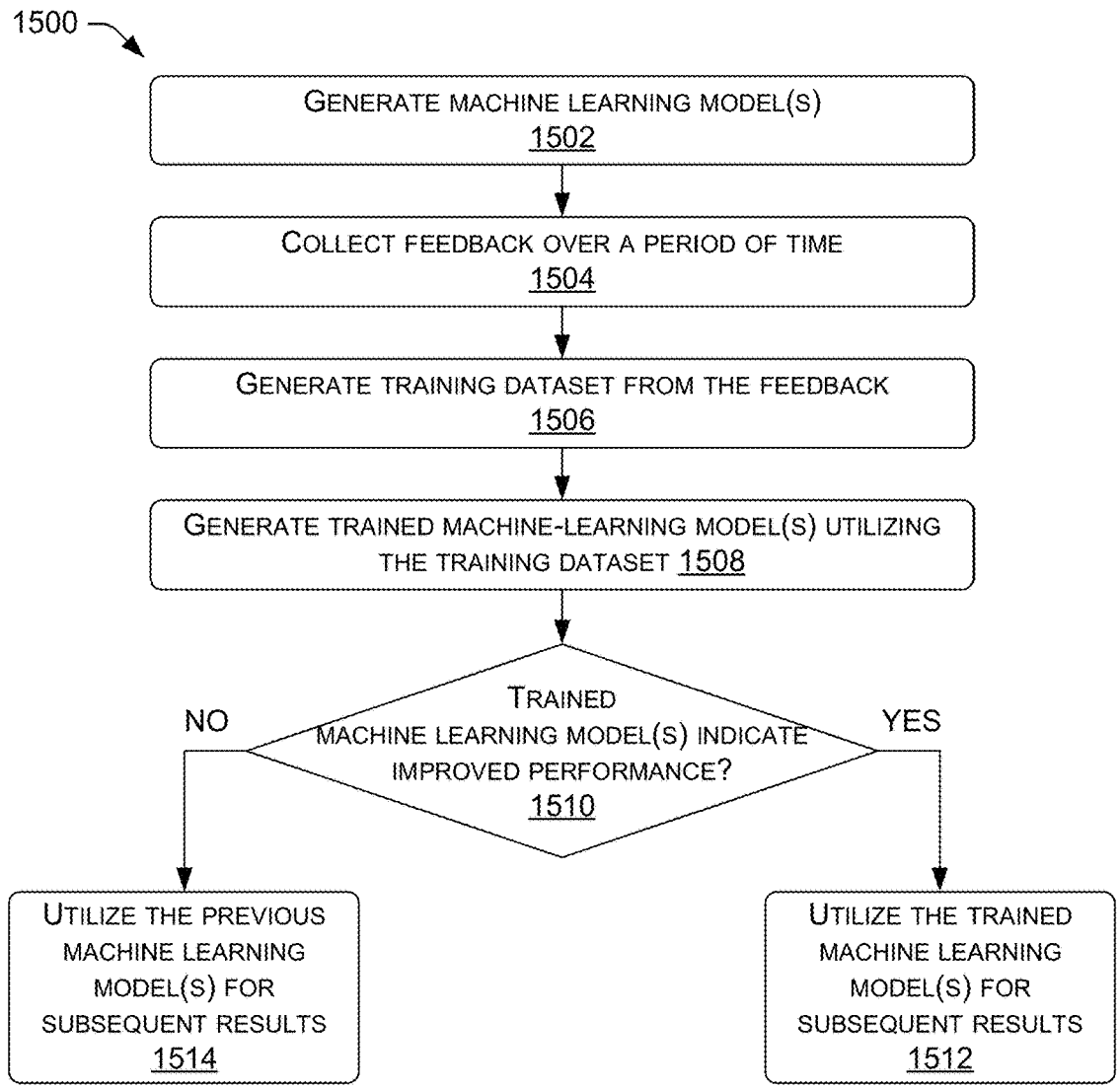
FIG. 15 illustrates a flow diagram of an example process for training one or more machine learning models in association with smart city solutions, according to examples of the present disclosure.

FIG. 15 illustrates process 1500 associated with dataset distinctiveness modeling. The process 1500 described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process 1500 is described with reference to the environments, architectures and systems described in the examples herein, such as, for example those described with respect to FIGS. 1-14, although the process 1500 may be implemented in a wide variety of other environments, architectures and systems.

FIG. 15 illustrates a flow diagram of an example process 1500 for training one or more machine learning models in association with smart city solutions. The order in which the operations or steps are described is not intended to be construed as a limitation, and any number of the described operations may be combined in any order and/or in parallel to implement process 1500. The operations described with respect to the process 1500 are described as being performed by the platform 102. However, it should be understood that some or all of these operations may be performed by some or all of components, devices, and/or systems described herein. For example, in some instances, the process 1500 or certain operations thereof may be performed by the third-party service(s) 130.

At block 1502, the process 1500 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 1504, the process 1500 may include collecting feedback data over a period of time. The feedback data may include information associated with smart city solutions, such as utilities (e.g., gas, water, electricity, etc.), traffic, weather, infrastructure, health (e.g., hospitals), waste (e.g., recycling, waste management, etc.), security (e.g., crime), transportation (e.g., public transportation usage), education, and so forth. This information may include factors that contributed to increased/decreased utilities, increased/decreased traffic, increased/decreased waste, increased/decreased transportation, and so forth. Moreover, the feedback may indicate effects of utilities, traffic, weather, infrastructure, health (e.g., hospitals), waste, security, transportation, education, and so forth, such as for example, how the weather impacts traffic, waste, security, and so forth.

At block 1506, the process 1500 may include generating a training dataset from the feedback data. Generation of the training dataset may include formatting the feedback data into input vectors for the machine learning model to intake, as well as associating the various data with the smart city solutions At block 1508, the process 1500 may include generating one or more trained machine learning models utilizing the training dataset. Generation of the trained machine learning models may include updating parameters and/or weightings and/or thresholds utilized by the models to generate the smart city solutions based at least in part on the data from the training dataset.

At block 1510, the process 1500 may include determining whether the trained machine learning models indicate improved performance metrics. For example, a testing group may be generated where the outcomes of the smart city solutions are known but not to the trained machine learning models. The trained machine learning models may generate the scores and/or vector representations of the smart city solutions, which may be compared to the known results to determine whether the results of the trained machine learning model produce a superior result than the results of the machine learning model prior to training.

In examples where the trained machine learning models indicate improved performance metrics, the process 1500 may include, at block 1512, utilizing the trained machine learning models for generating subsequent results. In examples where the trained machine learning models do not indicate improved performance metrics, the process 1500 may include, at block 1514, utilizing the previous iteration of the machine learning models for generating subsequent results.

In some instances, the improved performance metrics may be related to, or indicative of, improved air quality, energy efficiency, urban mobility, safety, waste, health, and security. For example a smart city solution may indicate how to increase air quality based on changes in traffic and/or energy generation. In this example, a subscriber may take advantage of the micro services offered by the platform to provide solutions for how to increase air quality. As another example, a smart city solution may provide changes to a buildings use of electricity, gas, water, air quality, and so forth as a way to provide benefits to the environment 104 such as to devise more eco-friendly programs for the building during non-peak hours.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system, comprising:
one or more processors; and
one or more non-transitory computer-readable media storing computer-executable instructions that, when executed by the one or more processors, cause the one or more processors to perform operations comprising:
receiving, from a first publisher, first sensor data generated by a first sensor, the first sensor data being associated with first utility information of a structure;
receiving, from a second publisher, second sensor data generated by a second sensor, the second sensor data being associated with second utility information of the structure;
sending, to a third party ledger, a first request to add the first sensor data to a first block of a first blockchain;
sending, to the third party ledger, a second request to add the second sensor data to a second block of a second blockchain;
receiving, from a subscriber, a third request to receive at least one of the first sensor data or the second sensor data; and
causing a user interface element to be presented to the subscriber to display the at least one of the first sensor data or the second sensor data.

2. The system of claim 1, the operations further comprising:
causing a second user interface element to be displayed to the first publisher associated with uploading the first sensor data; and
causing a third user interface element to be displayed to the second publisher associated with uploading the second sensor data.

3. The system of claim 1, the operations further comprising:
determining first contract details associated with the first publisher;
determining second contract details associated with the second publisher; and
determining third contract details associated with the subscriber,
wherein:
receiving the first sensor data is based at least in part on the first contract details,
receiving the second sensor data is based at least in part on the second contract details, and
causing the user interface element to be presented to the subscriber is based at least in part on the third contract details.

4. The system of claim 1, the operations further comprising:
providing, as an input to a machine-learned model, the first sensor data and the second sensor data;
receiving, as an output from the machine-learned model, an output associated with a smart city solution; and
providing the smart city solution to the subscriber.

5. The system of claim 1, the operations further comprising:
determining a first amount of data capable of being published by the first publisher;
determining a second amount of data capable of being published by the second publisher;
determining a third amount of data capable of being received by the subscriber;

causing a second user interface to be displayed to the first publisher associated with the first amount of data;
causing a third user interface to be displayed to the second publisher associated with the second amount of data; and
causing a fourth user interface to be displayed to the subscriber associated with the third amount of data.

6. A method comprising:
receiving, from a first publisher, first sensor data generated by a first sensor;
receiving, from a second publisher, second sensor data generated by a second sensor;
sending, to a third party ledger, a first request to add the first sensor data to a first block of a first blockchain;
sending, to the third party ledger, a second request to add the second sensor data to a second block of a second blockchain;
receiving, from a subscriber, a third request associated with receiving the first sensor data and the second sensor data, wherein the third request includes:
a first indication to combine one or more first fields of the first sensor data, and
a second indication to combine one or more second fields of the second sensor data;
generating, based at least in part on the third request, third sensor data including the one or more first fields;
generating, based at least in part on the third request, fourth sensor data including the one or more second fields; and
providing, to the subscriber, the third sensor data and the fourth sensor data.

7. The method of claim 6, further comprising causing a user interface element to be presented to the subscriber to display the one or more first fields of the first sensor data and the one or more second fields of the second sensor data,
wherein the first indication and the second indication are received via the user interface element.

8. The method of claim 6, further comprising:
receiving a fourth request from the subscriber associated with a smart city solution;
providing, as an input to a machine-learned model, at least the first sensor data and the second sensor data;
receiving, as an output from the machine-learned model, the smart city solution; and
providing the smart city solution to the subscriber.

9. The method of claim 6, wherein:
the first sensor is associated with a first device that measures first utility information; and
the second sensor is associated with a second device that measures second utility information.

10. The method of claim 6, wherein:
the method is performed by a data exchange platform;
the blockchain comprises a semi-permission blockchain network;
the data exchange platform is an only node of the semi-permission blockchain network that is able to request new blocks to be posted to the semi-permission blockchain network; and
the semi-permission blockchain network designates nodes of the first publisher, the second publisher, and the subscriber as read only nodes of the semi-permission blockchain network.

11. The method of claim 6, further comprising:
causing a first user interface to be presented to the first publisher, the first user interface including a first schema preview of the first sensor data; and
causing a second user interface to be presented to the second publisher, the second user interface including a second schema preview of the second sensor data.

12. The method of claim 11, wherein:
the first user interface permits the first publisher to modify a format of the first sensor data; and
the second user interface permits the second publisher to modify a format of the second sensor data.

13. The method of claim 6, further comprising causing a first user interface to be presented to the subscriber, the first user interface including a schema preview of the first sensor data and the second sensor data, the first user interface allowing the subscriber to modify a structure of the schema before download.

14. One or more non-transitory computer readable media storing instructions executable by a processor, wherein the instructions, when executed, cause the processor to perform operations comprising:
receiving, from a first publisher, first sensor data generated by a first sensor, the first sensor data being associated with first utility information of a structure;
receiving, from a second publisher, second sensor data generated by a second sensor, the second sensor data being associated with second utility information of the structure;
sending, to a third party ledger, a first request to add the first sensor data to a first block of a first blockchain;
sending, to the third party ledger, a second request to add the second sensor data to a second block of a second blockchain;
receiving, from a subscriber, a third request to receive at least one of the first sensor data or the second sensor data; and
causing a user interface element to be presented to the subscriber to display the at least one of the first sensor data or the second sensor data.

15. The one or more non-transitory computer readable media of claim 14, the operations further comprising:
causing a second user interface element to be displayed to the first publisher associated with uploading the first sensor data; and
causing a third user interface element to be displayed to the second publisher associated with uploading the second sensor data.

16. The one or more non-transitory computer readable media of claim 14, the operations further comprising:
determining first contract details associated with the first publisher;
determining second contract details associated with the second publisher; and
determining third contract details associated with the subscriber,
wherein:
receiving the first sensor data is based at least in part on the first contract details,
receiving the second sensor data is based at least in part on the second contract details, and
causing the user interface element to be presented to the subscriber is based at least in part on the third contract details.

17. The one or more non-transitory computer readable media of claim 14, the operations further comprising:
providing, as an input to a machine-learned model, the first sensor data and the second sensor data;
receiving, as an output from the machine-learned model, an output associated with a smart city solution; and
providing the smart city solution to the subscriber.

18. The one or more non-transitory computer readable media of claim 14, the operations further comprising:
- determining a first amount of data capable of being published by the first publisher;
- determining a second amount of data capable of being published by the second publisher;
- determining a third amount of data capable of being received by the subscriber;
- causing a second user interface to be displayed to the first publisher associated with the first amount of data;
- causing a third user interface to be displayed to the second publisher associated with the second amount of data; and
- causing a fourth user interface to be displayed to the subscriber associated with the third amount of data.

19. The one or more non-transitory computer readable media of claim 14, the operations further comprising:
- determining a first data format of the first sensor data generated by the first sensor;
- determining a second data format of the second sensor data generated by the second sensor, the second data format being different than the first data format;
- generating, using the first sensor data, third sensor data having a third data format; and
- generating, using the second sensor data, fourth sensor data having the third data format.

20. The one or more non-transitory computer readable media of claim 14, the operations further comprising:
- determining a first permission of the first publisher; and
- determining a second permission of the second publisher, wherein:
  - sending, to the third party ledger, the first request is based at least in part on the first permission, and
  - sending, to the third party ledger, the second request is based at least in part on the second permission.

\* \* \* \* \*